United States Patent
Talagala et al.

(10) Patent No.: US 7,062,704 B2
(45) Date of Patent: Jun. 13, 2006

(54) STORAGE ARRAY EMPLOYING SCRUBBING OPERATIONS USING MULTIPLE LEVELS OF CHECKSUMS

(75) Inventors: Nisha D. Talagala, Fremont, CA (US); Randall D. Rettberg, Danville, CA (US); Chia Y. Wu, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 728 days.

(21) Appl. No.: 09/880,616

(22) Filed: Jun. 12, 2001

(65) Prior Publication Data

US 2002/0162076 A1    Oct. 31, 2002

Related U.S. Application Data

(60) Provisional application No. 60/287,788, filed on Apr. 30, 2001.

(51) Int. Cl.
  *G06F 7/02* (2006.01)
(52) U.S. Cl. .................................. 714/819; 711/114
(58) Field of Classification Search ................ 714/819, 714/766, 770, 22, 42, 801, 5–11, 735; 711/114; 710/15, 19
See application file for complete search history.

(56) References Cited

U.S. PATENT DOCUMENTS

| | | | |
|---|---|---|---|
| 5,195,100 A * | 3/1993 | Katz et al. .................... 714/22 |
| 5,487,160 A * | 1/1996 | Bemis ......................... 711/114 |
| 5,596,708 A * | 1/1997 | Weber .......................... 714/42 |
| 5,819,109 A | 10/1998 | Davis | |
| 6,148,414 A * | 11/2000 | Brown et al. .................. 714/9 |
| 2001/0047497 A1 | 11/2001 | Larson et al. | |
| 2002/0016942 A1* | 2/2002 | MacLaren et al. ........... 714/718 |

* cited by examiner

*Primary Examiner*—Guy J. Lamarre
(74) *Attorney, Agent, or Firm*—Robert C. Kowert; Meyertons, Hood, Kivlin, Kowert & Goetzel, P.C.

(57) ABSTRACT

A storage system comprises a storage array controller and a storage array, which includes multiple storage devices and disk drive controllers. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

54 Claims, 12 Drawing Sheets

STORAGE ARRAY EMPLOYING SCRUBBING OPERATIONS USING MULTIPLE LEVELS OF CHECKSUMS

This application claims benefit of priority to U.S. Provisional Application Ser. No. 60/287,937, filed Apr. 30, 2001.

BACKGROUND OF THE INVENTION

1. Field of the Invention

This invention relates to error detection in storage systems.

2. Description of the Related Art

By replacing individual storage devices with arrays of storage devices, the capacity and performance of storage systems has been improved. Arrays of storage devices have increased the capacity of disk storage systems by providing more storage capacity than is available using individual disks. Also, because several smaller, less expensive disks can provide the same storage capacity as a single larger, more expensive disk, this increased capacity can often be provided in a relatively cost effective manner. Additionally, some arrays of storage devices are also able to provide increased reliability and/or performance over non-arrayed storage devices.

One example of an array of storage devices is a Redundant Array of Independent (or Inexpensive) Disks (RAID). Some RAID systems improve storage performance by providing parallel data paths to read and write information over an array of disks or by issuing read and write commands in parallel to different disks. By reading and writing multiple disks simultaneously, a storage system's performance may be greatly improved. For example, an array of four disks that can be read from and written to simultaneously may provide a data rate that is almost four times the data rate of a single disk.

Unfortunately, one disadvantage of using arrays of multiple disks is increased failure rates. In a four disk array, for example, the mean time between failure (MTBF) for the array may be approximately one-fourth that of a single disk. Stated more generally, the MTBF for a storage array is inversely proportional to the number of components in the array. It is not uncommon for storage arrays to include many more than four disks, so the MTBF for such arrays may be shortened from years to months or even weeks. However, some storage arrays address this reliability concern by storing redundant data (e.g. parity information and/or mirrored copies) so that data lost during a component failure can be reconstructed. Additionally, some storage arrays allow failed units to be easily replaced. For example, many storage systems have "hot swapping" capabilities, which allow failed drives be replaced without requiring the rest of the storage array to be powered down. Some storage systems also include "hot spares," which are extra disks that can be switched into active service if another disk in the array fails. As a result of these features, some storage arrays may ultimately be more reliable than a single disk system, even though the storage arrays have shorter MTBFs.

In RAID systems, varying levels of performance and/or redundancy can be achieved by using various techniques or levels. One common RAID technique or algorithm is referred to as RAID 1. In a RAID 1 system, all data is mirrored within the storage system. In other words, a duplicate copy of all data is maintained within the storage system. Typically, a RAID 1 system performs mirroring by copying data onto two separate disks. As a result, a typical RAID 1 system requires double the number of disks of a corresponding non-mirrored array in order to store two copies of all of the data.

RAID 0 is an example of a RAID algorithm used to improve performance by attempting to balance the storage system load over as many of the disks as possible. RAID 0 implements a striped disk array in which data is broken down into blocks and each block is written to a separate disk drive. This technique is referred to as striping. Typically, I/O performance is improved by spreading the I/O load across multiple disks since blocks of data will not be concentrated on any one particular drive. However, a disadvantage of RAID 0 systems is that they do not provide for any data redundancy and thus are not fault tolerant.

RAID levels 3, 4, and 5 provide both fault tolerance and load balancing by calculating parity information for data and striping data across multiple disks. RAID 3 stripes bytes of data across multiple disks. Parity information is calculated and stored on a dedicated parity disk. Any single data disk can fail and the data stored on that disk can be recalculated using the remaining data and parity information. Similarly, if the parity disk fails, the parity information can be recalculated from the data stored on the data disks. Because all parity information is stored on a single disk, however, the parity disk must be accessed every time data is sent to the array, and this may create a performance bottleneck. RAID 4 systems differ from RAID 3 systems in that blocks, not bytes, of data are striped across the disks in the array, which may improve performance during random accesses. In RAID 5 systems, instead of storing parity information on a dedicated disk, both data and parity information are striped across the disk array. Like RAID 3 and 4 systems, RAID 5 systems can withstand a single device failure by using parity information to rebuild a failed disk. One drawback of RAID levels 3, 4, and 5 is that write performance may suffer due to the overhead required to calculate parity information. However, these RAID levels are advantageous in that only one additional disk is required to store parity information, as opposed to the 2×number of disks required for typical RAID 1 systems. Many additional RAID systems and levels are also available.

When storage arrays provide redundant data, their ability to reconstruct lost data may depend on how many failures occurred. For example, some RAID systems may only be able to tolerate a single disk failure. Once a single disk fails, such systems are said to be operating in a degraded mode because if additional disks fail before the lost data on the failed disk has been reconstructed, it may no longer be possible to reconstruct any lost data. The longer a storage array operates in a degraded mode, the more likely it is that an additional failure will occur. As a result, it is desirable to detect and repair disk failures so that a storage array is not operating in a degraded mode.

An additional potential problem in any storage array is that errors other than total disk failures may occur, and like disk failures, these errors may cause data vulnerability or data loss. For example, disk drives may occasionally corrupt data. The corruptions may occur for various different reasons. For example, bugs in a disk drive controller's firmware may cause bits in a sector to be modified or may cause blocks to be written to the wrong address. Such bugs may cause storage drives to write the wrong data, to write the correct data to the wrong place, or to not write any data at all. Another source of errors may be a drive's write cache. Many disks use write caches to quickly accept write requests so that the host or array controller can continue with other commands. The data is later copied from the write cache to the storage media. However, write cache errors may cause some acknowledged writes to never reach the storage media. The end result of such bugs or errors is that the data at a given block may be corrupted or stale. These types of errors may be "silent" because the disk may not realize that it has erred. If left undetected, such errors may have detrimental consequences, such as undetected long-term data corruption. In storage arrays with no redundancy and no backup system in place, these errors may lead directly to data loss. Furthermore, such data loss may not even be fixable via backup. For example, if the data was corrupted when it was written to the storage array, the backups themselves may only contain copies of the corrupted data. Also, if the backups are only maintained for a relatively short duration, a valid copy of the data may no longer exist.

Silent errors pose an additional hazard in arrays that provide redundancy. FIG. 1A shows a storage array 10 that provides redundancy through mirroring. Storage devices 1 and 2 are part of a mirrored pair in storage array 10. At some point, a silent error may corrupt the copy of data A that is stored on device 2, as indicated by the "X" in FIG. 1A. Subsequently, device 1 may fail. At that time, there is no accurate copy of data A in the storage array 10 because device 2's copy is corrupted.

FIG. 1B shows another storage array 20 that provides redundancy through parity. In this example, data is striped across disks 1–4 and device 5 stores parity information for each stripe. A silent error may corrupt data in block B(3) on device 4. Some time later, device 2 may experience a failure. Depending on the type of parity information calculated, it may be impossible to recreate either the lost data block B(1) or the corrupted data block B(3) at this point.

In general, after a silent error corrupts data, a storage array may be effectively operating in a degraded mode with respect to that data. For example, in FIG. 1A, storage array 10 was operating in a degraded mode with respect to data A after the silent error corrupted device 2's copy of A. Similarly, in FIG. 1B, the storage array 20 may have been operating in a degraded mode with respect to stripe B after a silent error corrupted stripe unit B(3). As noted previously, the MTBF for a storage array may be relatively low, so the chance of another error occurring before a silent error is detected is not insignificant. In either of the situations illustrated in FIGS. 1A and 1B, it may be impossible to restore the corrupted data after a subsequent disk failure unless a valid backup is available. Thus, FIGS. 1A and 1B illustrate just a few of the ways that silent errors may lead to data vulnerability and data loss, even in systems that provide redundancy.

SUMMARY

Various embodiments of systems and methods for performing error detecting scrubbing operations are disclosed. In one embodiment, a storage system is disclosed. The storage system comprises a storage array controller and a storage array coupled to the storage array controller by an interconnect. The storage array includes a plurality of disk drives and disk drive controllers. In one embodiment, storage array controller may be implemented in software running on a host computer system. In some embodiments, the storage array may be configured to store data using striping or mirroring. The storage array controller is configured to issue one or more scrubbing operation commands. In several embodiments, the storage array controller may also be configured to issue multiple scrubbing operation commands in parallel to multiple disk controllers. Each disk drive controller is configured to receive one of the scrubbing operation command, to read data from within a data range from at least one of the disk drives, to calculate a new checksum for the data, and to compare the new checksum to a preexisting checksum for the data. If the new checksum differs from the preexisting checksum, each disk controller is further configured to respond to the received scrubbing operation commands.

In some embodiments, the storage array controller may be configured to specify the data range for each scrubbing operation command that it issues. For example, in one embodiment, the storage array controller may specify the data range for a scrubbing operation command by specifying a starting address of the data range and a number of blocks with the data range. In some embodiments, the storage array controller may specify the preexisting checksum in each scrubbing operation command.

Each disk controller may, in some embodiments, respond to the received one of the scrubbing operation commands by indicating that the data within the data range is erroneous if the new checksum does not equal the pre-existing checksum. For example, a disk controller may indicate an address of the erroneous data. In some of these embodiments, the storage array controller may be configured to initiate a reconstruction attempt of the erroneous data in response to one of the disk controllers indicating that the data is erroneous. If the new checksum does equal the preexisting checksum, each disk controller may be configured to indicate that the scrubbing operation was successful and/or that the data is not erroneous. In some embodiments, each disk controller may include a checksum engine configured to calculate the new checksum. For example, each disk controller may be configured to calculate the new checksum using an exclusive-OR (XOR) checksum algorithm. In several embodiments, each disk controller may actually include two or more separate disk controllers, where a first disk controller is integrated with one of the disk drives and the second disk controller is coupled between the storage array controller and the first disk controller. There may be multiple first disk controllers in some embodiments, and each of the first disk controllers may be configured to read data within the data range from one of the disk drives and to provide the data to the second disk controller. The second disk controller may be configured to calculate the new checksum.

In some embodiments, the storage array controller may calculate the preexisting checksum for the data when the data is written to the storage array. In other embodiments, the storage array controller may receive the preexisting checksum for the data from a host computer system when the host computer system writes the data to the storage array. In one embodiment, the storage array controller may maintain the preexisting checksum in a cache coupled to the storage array controller. The storage array controller may be configured to store the preexisting checksum in a location that is independent of a location where the data verified by the preexisting checksum is stored.

In some embodiments, each data range may be a multi-unit data range, and the storage array controller may be configured to calculate the preexisting checksum directly from the data in the multi-unit data range. In other embodiments, the data range may be a multi-unit data range, and the storage array controller may be configured to calculate the preexisting checksum from a plurality of unit checksums that each correspond to a unit within the multi-unit data range. In some of these embodiments, the storage array controller may be configured to compute the preexisting checksum on the fly when issuing each scrubbing operation command. A unit may be a byte or block of data in some embodiments. If the data within the multi-unit data range is erroneous, some embodiments may further pinpoint the location of the error. For example, in one embodiment the storage array controller may issue a second scrubbing operation command to one of the disk controllers in response to that disk controller responding to the first scrubbing operation command.

Several embodiments of a method of performing scrubbing operations in a storage array are also disclosed. In one embodiment, the method includes a storage array controller issuing a first scrubbing operation command, to a disk controller. In response to receiving the first scrubbing operation command, the disk controller reads the data within a first data range, If the new first checksum differs from the original first checksum, the disk controller responds to the first scrubbing operation.

Several embodiments of a disk controller are also disclosed. In one embodiment, the disk controller includes a first interface configured to be connected to a storage array via an interconnect, a second interface configured to access the storage media of a disk drive, and a controller. The controller may be configured to receive a scrubbing operation command, to read data within a range of data from the storage media of the disk drive. The controller may then be configured to calculate a checksum for the data, to compare the checksum to a preexisting checksum for the data, and if the checksum differs from the preexisting checksum, to respond to the scrubbing operation command. In one embodiment, the disk controller may actually include several disk controllers. For example, one disk controller may be integrated with a disk drive, and the other disk controller may be coupled between the first disk controller and the storage array controller.

Figure 1A:
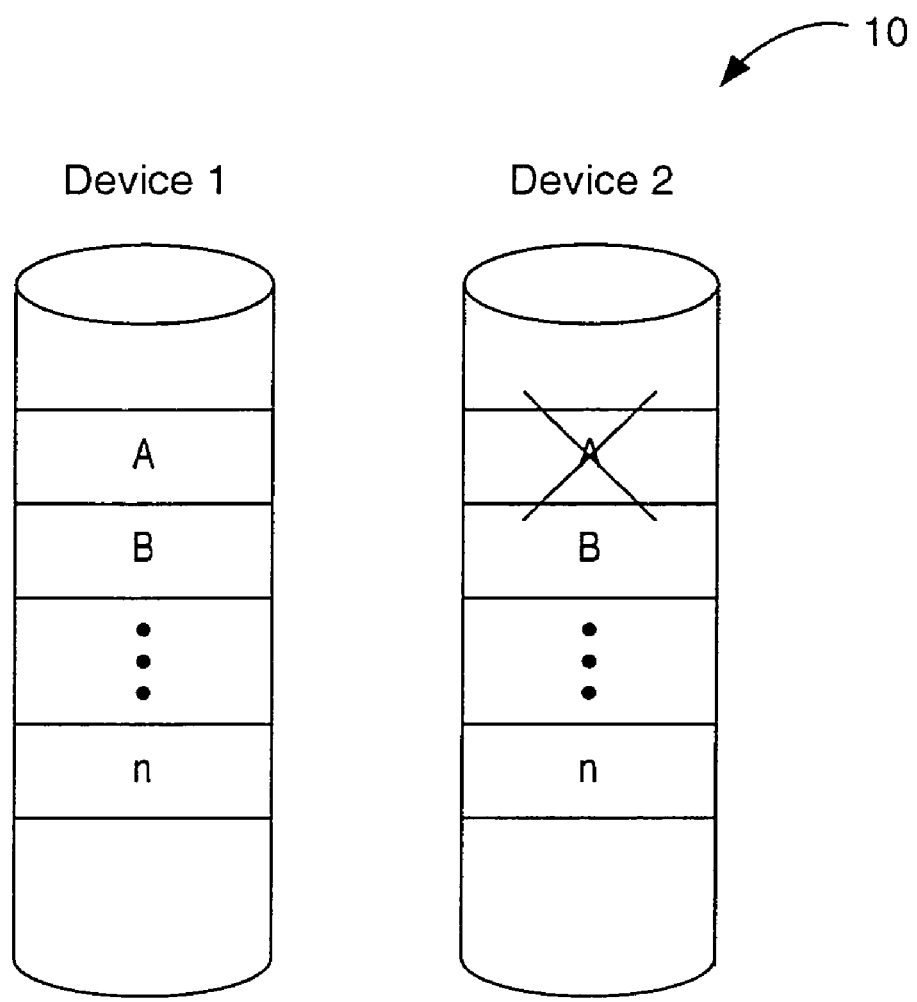
FIG. 1A illustrates a typical storage array using mirroring to provide redundancy.
Figure 1B:
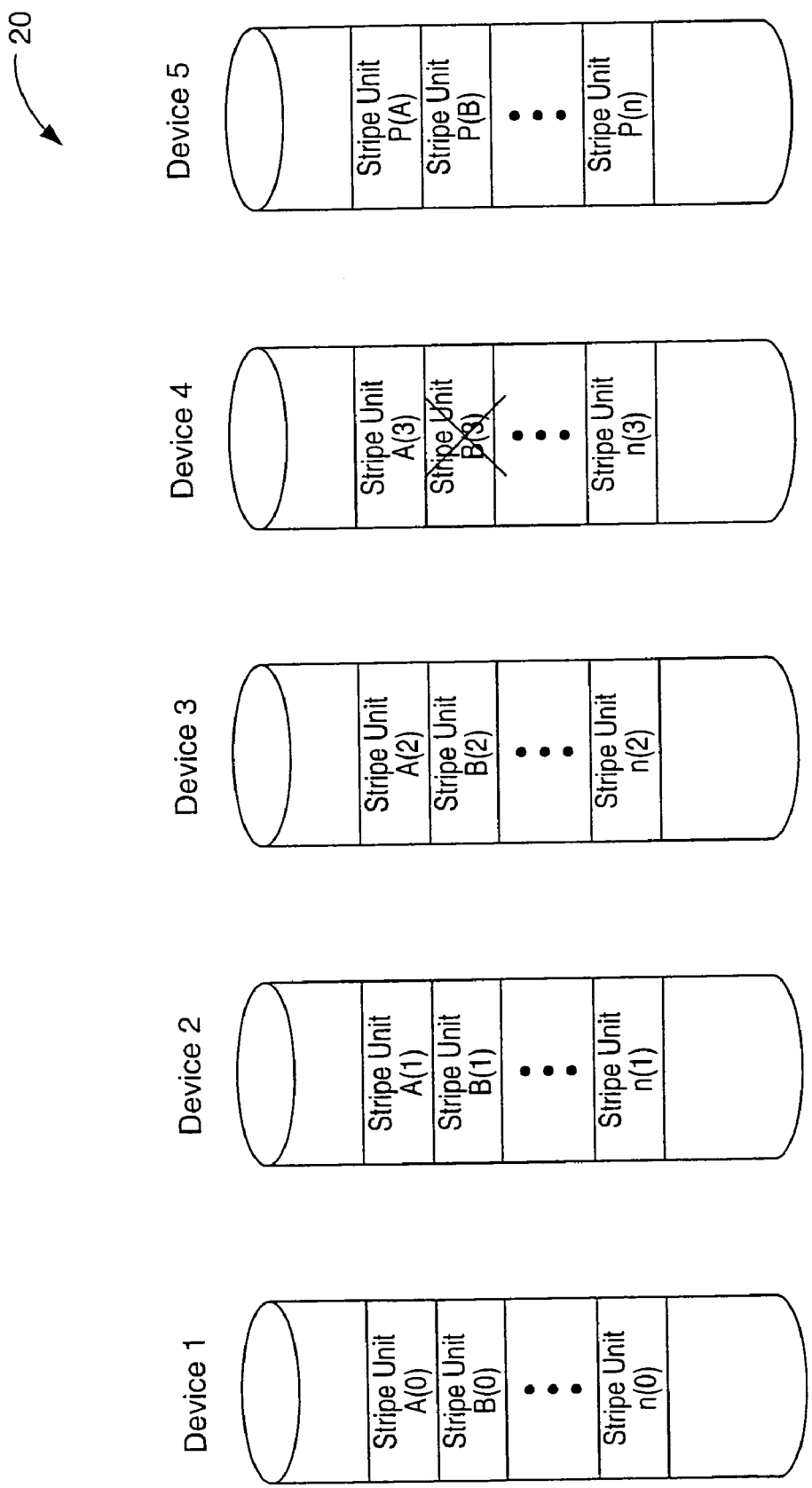
FIG. 1B illustrates a typical storage array providing striping and redundancy via parity.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2A:
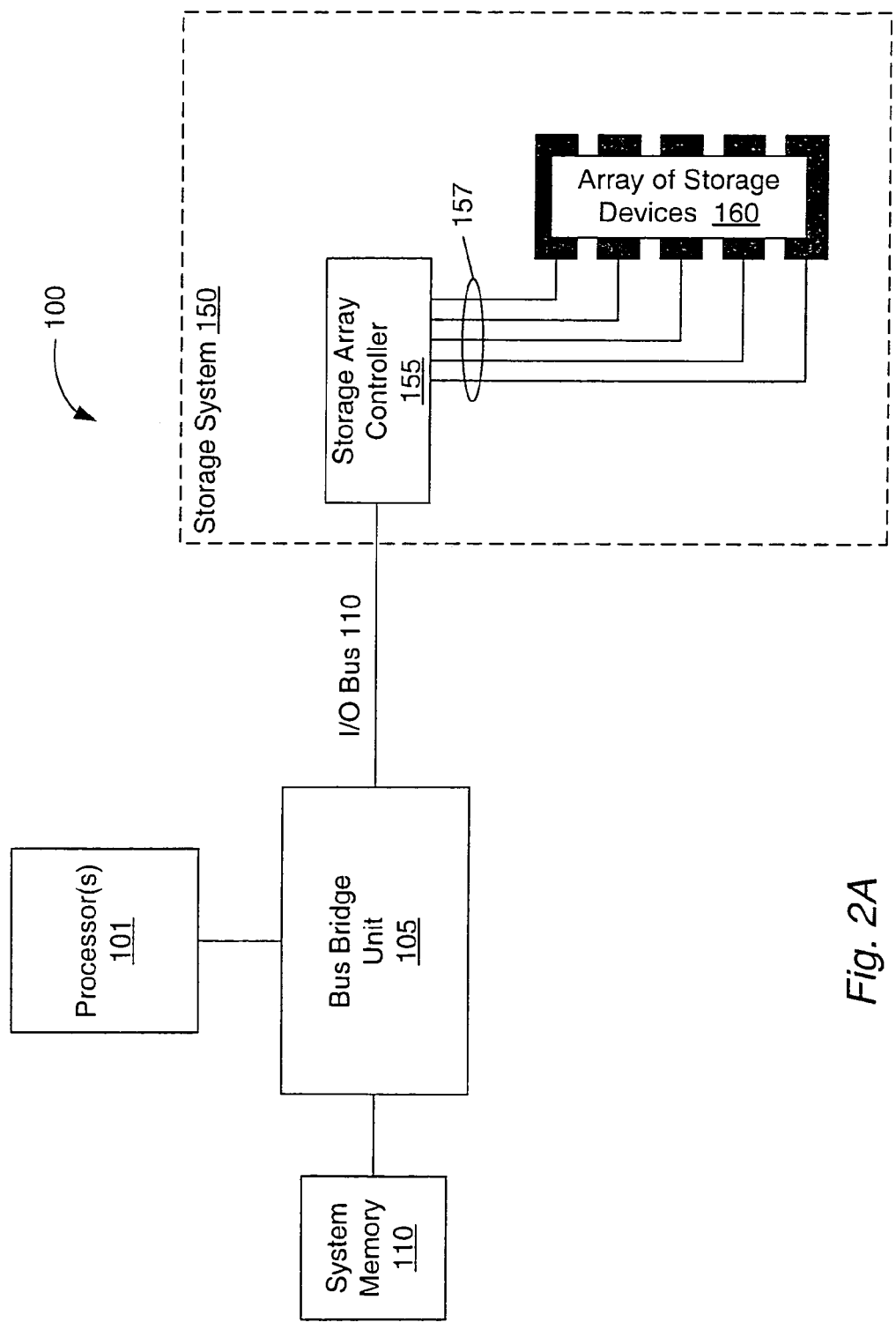
FIG. 2A illustrates one embodiment of a host computer system and a storage array.

FIG. 2A shows an example of a computer system 100 in which embodiments of the invention may be employed. A storage system 150 may be coupled to a computer system 100 by an I/O bus 110. The computer system 100 may include one or more processors 101 and various I/O devices such as a monitor, keyboard, mouse, etc. (not shown). The illustrated computer system includes a processor 101 coupled to a bus bridge unit 105. The bus bridge unit 105 is coupled to a system memory 110 and to a storage system 150. The processor 100 may use the system memory 110 to temporarily store data and software instructions that are accessed rapidly during system operation. The bus bridge 105 may contain hardware to control the system memory 110 and/or the data storage subsystem 150. The I/O bus 110 may connect the bus bridge 105 to the storage system 150 and may be a bus such as the peripheral component interconnect (PCI) bus in some embodiments. In other embodiments, the I/O bus 110 may be implemented using Fibre Channel, Small Computer System Interface (SCSI), system I/O or other means for interfacing processor(s) 101 to storage system 150. In some embodiments, the computer system 100 may communicate with the storage system 150 via a network (e.g., a storage area network). The data storage system 150 includes an array of storage devices that may also store data and software instructions.

In some embodiments, the storage array 160 may be configured as a RAID system. The storage system 150 may include one or more array controllers 155 and an array of disks 160. The array controller 155 may control the higher-level mapping, accessing, reconstructing, etc. of data in the array of disks 160. The array controller 155 may be implemented in hardware in some embodiments. In other embodiments, the array controller 155 may be implemented in software running on computer system 100 (e.g. an operating system of computer system 100) or in a combination of both hardware and software. The array of disks 160 may be coupled to the array controller 155 by an interconnect 157. The interconnect 157 may be implemented according to various standards such as Fibre Channel, Fibre Channel-Arbitrated Loop (FC-AL), SCSI, High Performance Parallel Interface (HiPPI), AT Attachment (ATA), etc. Various combinations and variations of these standards may also be used in some embodiments.

Figure 2B:
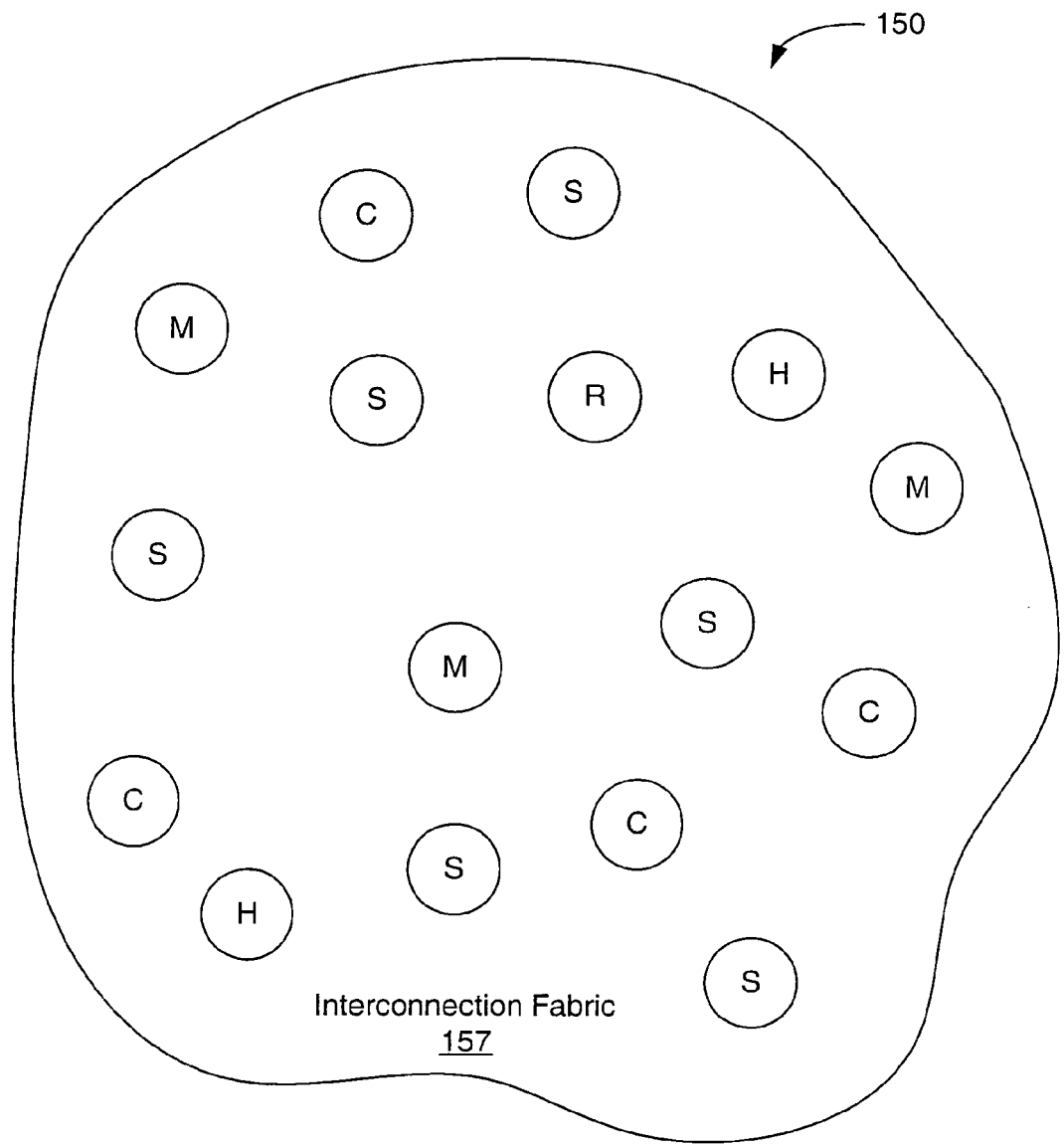
FIG. 2B illustrates another embodiment of a storage array.

Turning briefly to FIG. 2B, a diagram of another embodiment of storage system 150 coupled together by an interconnection fabric 157 is shown. An interconnection fabric 157 is shown with several nodes. Each node may support one or more different types of devices in a storage system. The nodes are labeled with the letters C, H, M, R and S. A node with the letter C means the node may be configured to support a controller such as a Redundant Array of Inexpensive Disks (RAID) controller. A node with the letter H means the node may be configured with a host interface or line card that may serve as an interface to a host computer. A node with the letter R means the node may be configured as a routing node and merely expands the communication paths available between other nodes. A node with the letter S means the node may be configured as a mass storage node and may be connected to one or more mass storage devices such as disk drives. A node with the letter M means the node may be configured as a storage cache memory node that provides, for example, a hierarchical storage cache for one or more mass storage nodes. Also, nodes may support any combination of these features. It is noted that while the nodes are configured and labeled in the embodiment of FIG. 2B, this is only an exemplary drawing. In other embodiments, there may be other configurations that have a fewer or greater number of nodes and the nodes may be configured and used differently. For example, there may be a fewer or greater number of S nodes and a fewer or greater number of H nodes.

Generally speaking, each node may be connected to each other node in the fabric by one or more communication paths (not shown in FIG. 2B). In one embodiment, the communication paths form the fabric 157 such that each communication path may be completely independent of each other path. Therefore, each node may have multiple possible paths to use when communicating with another node. Multiple independent paths may allow a source node and a destination node to continue communicating with each other even if one or more communications paths or nodes between the source and destination nodes becomes inoperative. The interconnect fabric 157 may be a point-to-point interconnect between each node, in which multiple independent paths exist between a source node and a destination node. In one embodiment, every node has multiple independent paths to communicate with every other node. The path independence of the fabric 157 may allow a node or a path to fail or experience adverse conditions (e.g. congestion) without affecting any other node or path. In various embodiments, the interconnect 157 may be logically configured in a certain topology (e.g., a torus, hypercube, complete graph, fat tree, mesh, ring, star, etc.). In other embodiments, other interconnect fabrics may be used (e.g., Fibre Channel (see the ANSI Fibre Channel Fabric Generic Requirement (FC-FG) Document), InfiniBand architecture, etc.).

Returning to FIG. 2A, the array controller 155 may, in some embodiments, operate to perform striping and/or mirroring of data in the array of disks 160. Each element of the array of disks 160 may be a separate disk or any other logical division of disks. For example, each element of the array may be a cylinder of a hard disk. It is also noted that the system may include multiple storage systems 150. Also, each storage system 150 may include multiple arrays 160 of multiple disks and/or multiple storage array controllers 155.

Additionally, each disk within storage array 160 may include a disk controller that controls that storage disk's operation. Alternately, some disk controllers may be configured to control multiple disks in some embodiments. Generally, disk controllers control the operations of a disk drive at a relatively low level, as opposed to array controllers, which manage the higher-level operations of an entire storage array. For example, a typical integrated disk controller may control the actuator and other internal components of the disk drive when writing data to or reading data from the disk. Thus, in a typical embodiment, an array controller may provide a read or write instruction to a disk controller, and the disk controller may perform the actual read from or write to the actual disk storage media in response to receiving the instruction from the array controller.

Computer system 100 may include a file system software that provides logical structures and software routines that may be used to control access to the storage system 150. For example, in some embodiments, the file system may be part of an operating system running on computer system 100.

There are many possible sources of undetected errors that may occur in storage system 150. For example, many disk controllers contain firmware that defines how the disk controller works. However, there may be errors in the firmware. These errors may cause the disk to write the wrong data, to write the correct data to an incorrect location, or to not write any data at all. Firmware errors may also cause data to be modified erroneously. Other possible undetected errors include write cache errors that may result in a write being acknowledged even though no data is actually written to the disk. While the disk controllers may, in some embodiments, be configured to detect certain errors, they may not be able to detect all possible errors. The undetectable errors are sometimes referred to as "silent errors" since no error state is entered and no error condition is generated when they occur. For example, a disk controller may experience a silent error when it assumes a write operation has completed successfully even though an error has actually occurred. Silent errors may lead to stale or corrupt data. Stale or corrupt data may not be detected until a subsequent read, and at that time, it may no longer be possible to reconstruct the data.

In some embodiments, a storage system such as storage system 150 may not be configured to provide any data redundancy. For example, storage system 150 may be configured as Just a Bunch of Disks (JBOD) storage array or as a RAID 0 array. In such an array, a silent error may corrupt data. Unless a valid backup of that data is available, that data may be permanently lost. Furthermore, a condition that causes a silent error may recur, corrupting other data in the storage system. Consequentially, it is desirable to discover silent errors in order to isolate and correct the source of the error and to prevent further data loss.

A storage system such as storage system 150 may be configured as a redundant storage system in some embodiments. For example, a storage system may be configured as a RAID 5 array. In accordance with RAID 5, such a storage system may store parity information for each data stripe so that lost data may be reconstructed in the event of a device failure. However, an undetected error may corrupt data stored in the storage array. As a result, the storage array may be unknowingly operating in a degraded mode with respect to that data, leaving that data and/or other data vulnerable to a subsequent error or device failure. If a subsequent error or device failure occurs, it may not be possible to reconstruct either the data lost to the error or device failure or the data corrupted by the silent error. Thus, even in redundant storage arrays, it is desirable to detect silent errors.

Figure 3:
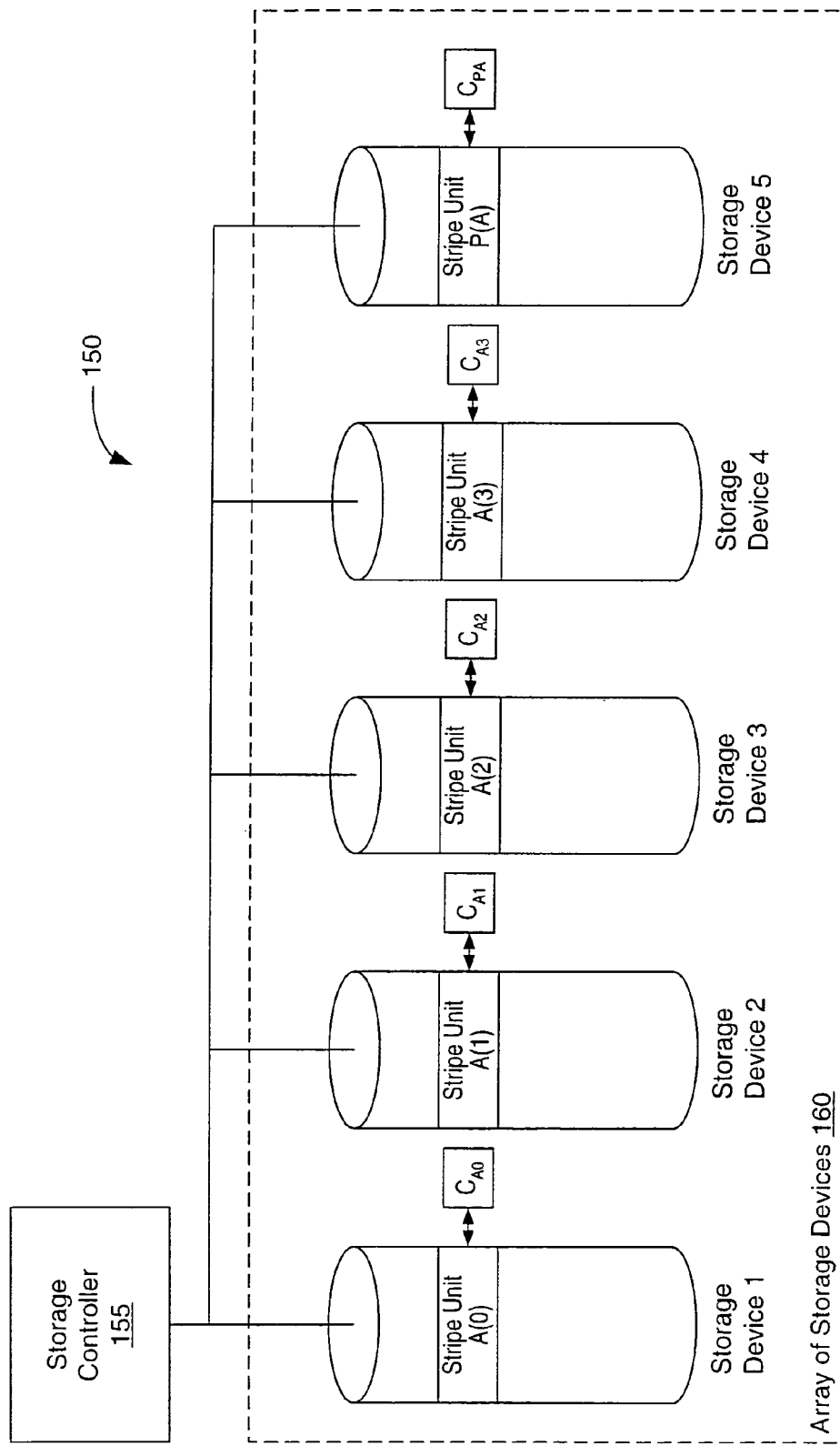
FIG. 3 shows an example of checksums that may be used in some embodiments of a storage array.

In some embodiments, checksums may be used to detect silent errors. For example, each block of data in the storage system may have an associated checksum. The checksums may be several bytes in size, and can be computed via a variety of algorithms such as XOR, CRC (cyclic redundancy code), etc. Generally, a checksum may be any segment of data that allows the integrity of another unit of data to be verified. Depending on the algorithm used to calculate a checksum, the checksum may be much smaller than the data it checks. Checksums may enable detection of corrupt or stale data caused by silent errors. FIG. 3 illustrates checksums $C_{A0}$ through $C_{A3}$ corresponding to data blocks A(0) through A(3) and checksum $C_{PA}$ corresponding to parity block P(A).

In one embodiment, one or more checksums are read during a read operation of the corresponding block(s). In one embodiment, the checksum(s) are read first, then the corresponding data block(s) are read, and then new checksum(s) for the corresponding data blocks are calculated and compared with the checksum(s). If the two match, the data block contains the correct bits with very high probability. Alternately, data block(s) and their corresponding checksum(s) may be read together so that both the block(s) and the checksum(s) may be returned together in response to the read request. In this embodiment, the data returned may be checked at various points during its path.

During a write operation, the data to be written and a corresponding checksum may be passed to a drive to be written. The data may be compared with its checksum to insure that the data to be written is correct. Then both the data and checksum may be written to disk.

In one embodiment, the checksums may be calculated by a host computer system's file system. Thus, the file system may be configured to calculate checksums on data before it is transferred to the storage array. When the data is passed to the storage array, the file system may pass the checksum (s) corresponding to the data along with the data. These embodiments may enable the detection of errors that occur while the data is being transferred from the file system to the storage array. However, if the file system and the array controller use different methods of calculating checksums, they may return different checksums for identical data. Therefore, if the same checksum is to be used at both the file system level and the array controller level, the file system and the array controller may need to agree on the method of calculating the checksum so that their checksums are consistent with each other. In other embodiments, such as those where the array controller's and file system's methods of calculating checksums differ, or in embodiments where only the array controller calculates checksums, the checksums used in the scrubbing operations may be calculated by the array controller instead of the file system.

There are also many methods available for calculating the checksums. For example, a simple checksum algorithm may use the logical exclusive-OR, or XOR, function to calculate checksums. Another technique may calculate the number of set bits in a particular unit of data to get a parity bit. If odd parity is used, the parity bit is 1 if the number of set bits in a unit of data is odd. Similarly, in even parity, the parity bit is set if the number of 1 bits in a unit of data is even. Other checksums such as ECC (Error Checking and Correcting or Error Checking Code), Reed-Solomon codes, and CRC (Cyclical Redundancy Checking) may be used in other embodiments. Generally, computing checksums for a given unit of data may involve many different methods of sequentially combining subunits of the data using some series of arithmetic or logical operations.

There are also several options available for storing the checksums. In one embodiment, the array controller may append a checksum at the end of the data that checksum verifies as the data is being written to the storage array. However, this embodiment may not adequately protect against silent errors since the checksum is stored in the same error-prone environment (e.g., a location that firmware subsequently erroneously modifies) or using the same error-prone operation (e.g., a write that fails due to a write cache error) as the data it is intended to protect. For example, if the disk drive fails to perform the write correctly, the checksum may also not be written, and thus the error may not be caught on any subsequent read. Other embodiments may provide better protection against silent errors by storing checksums in a location that is independent of the location(s) where the data verified by that checksum is stored. For example, in one embodiment, such an independent location may simply be an independent location on the same disk. In another embodiment, an independent location may be a location on a separate device within the storage array, such as a separate, non-volatile checksum memory. However, these embodiments storing checksums in independent locations also have drawbacks if every access to those checksums requires a separate operation to read or write the checksum.

To address this potential problem, the checksum-calculating device may cache the checksums in some embodiments. For example, in one embodiment, the array controller may both calculate and cache the checksums. Caching the checksums in an independent location may improve both the protection against silent errors and the performance of the storage array. Since the checksums may be much smaller than their corresponding blocks, many or all of the checksums may be stored in a cache or other fast non-disk memory. However, if the checksum memory is volatile, the checksums may still be stored to a mass disk to prevent loss.

In some embodiments, merely using checksums may not provide optimal protection against silent errors. For example, a storage array may calculate a checksum for each block of data written to the array. The stored checksum may then be used to check the stored data in a subsequent read. Thus, when the data is read, the checksum for that data may also be read and used to check the data for errors. However, because there may be a significant delay between a write and a subsequent read of that same block of data, there is a chance that an error may have occurred during the intervening period. This leaves a storage system vulnerable to data loss during that period. For example, if data was corrupted during a write, the error would be detected upon a subsequent read, but there might not be any way to recreate the corrupted data at that time (e.g., redundant information may no longer exist or backup copies of the data may be unavailable).

In some embodiments, a storage array controller may perform "scrubbing" operations that check stored data against one or more checksums for that data. Depending on how often the scrubbing operations are performed, some embodiments may shorten the time period during which silent errors can lie dormant. These scrubbing operations may be performed independently of any read requests for the data, and as a result, errors may be detected sooner than they would be detected in systems that do not perform scrubbing operations. In storage arrays using scrubbing operations, the array controller or file system controlling the array may calculate a checksum for every unit of data written to the array. Generally, a unit of data refers to a segment of data that is operated on as a whole. For example, depending on the embodiment, a unit of data may be a bit, byte or block (or multiple bits, bytes, or blocks) of data. Accordingly, a checksum may be calculated for each byte or block of data written to the storage array. These checksums may be maintained (e.g., cached or stored) by the array controller and/or file system and may also be used to verify the data on subsequent reads. During a scrubbing operation, the array controller may read all of the data to be scrubbed, calculate a new checksum for each unit of data, and compare the new checksum to the already-calculated checksum. If the two match, the data is determined to be correct. However, if the new checksum differs from the earlier checksum, the data is determined to be invalid. In systems with redundancy, the erroneous data may then be reconstructed. Thus, routinely performing scrubbing operations may make a redundant storage array less susceptible to data loss caused by silent errors. Likewise, in a non-redundant storage array employing checksums, scrubbing operations may help detect error-causing components so that they can be corrected or replaced before additional data loss occurs.

Unfortunately, performing scrubbing operations at the array controller or host level may reduce system performance if all of the data being scrubbed is read out and transferred over the interconnect to the storage array controller or host during the scrubbing operation. Such scrubbing operations may consume a large portion of the storage system bandwidth. Thus, while data is being scrubbed, the array is busy transferring data for the scrubbing operation, and this may cause the array's performance for other operations to suffer. Furthermore, the storage array system may not be able to handle a parallel transfer of all the data being scrubbed, and as a result, it may not be possible to scrub data on multiple disks at the same time. This may further increase the time consumed by scrubbing operations. Because of these factors, the performance impact of such scrubbing operations may be undesirable or impractical.

In one embodiment, by implementing the scrubbing operations at the disk controller level instead of at the array controller level, these bandwidth and performance difficulties may be overcome. For example, in some embodiments, some of the disk controllers in a storage array may be configured to perform scrubbing operations on the disks they control. Thus, instead of having the array controller read data from the array in order to check it against its checksum, the array controller may instead issue a scrubbing operation command to one or more of the disk controllers in the array. Thus, looking back at FIG. 2, the array controller 155 or the host computer system 100 may be configured to issue scrubbing operation commands to one or more of the disk controllers in the storage array 160. In some embodiments, the issuer of the scrubbing command may also specify a range of data to be scrubbed and/or the checksum(s) associated with the data to be scrubbed. In response, the disk controller(s) may then initiate scrubbing operations by reading each unit of data, calculating a new checksum for each unit of data, and comparing each newly calculated checksum with the preexisting checksum for each unit of data. If the disk controller(s) performing the scrubbing operation detect a discrepancy between the old and new checksums for a particular unit of data, that data may be corrupted (e.g., by a silent error). In response to detecting such a discrepancy, the disk controller(s) may respond to the issuer of the scrubbing operation command. This response may indicate that the data is erroneous and/or an address of the erroneous data.

Figure 4:
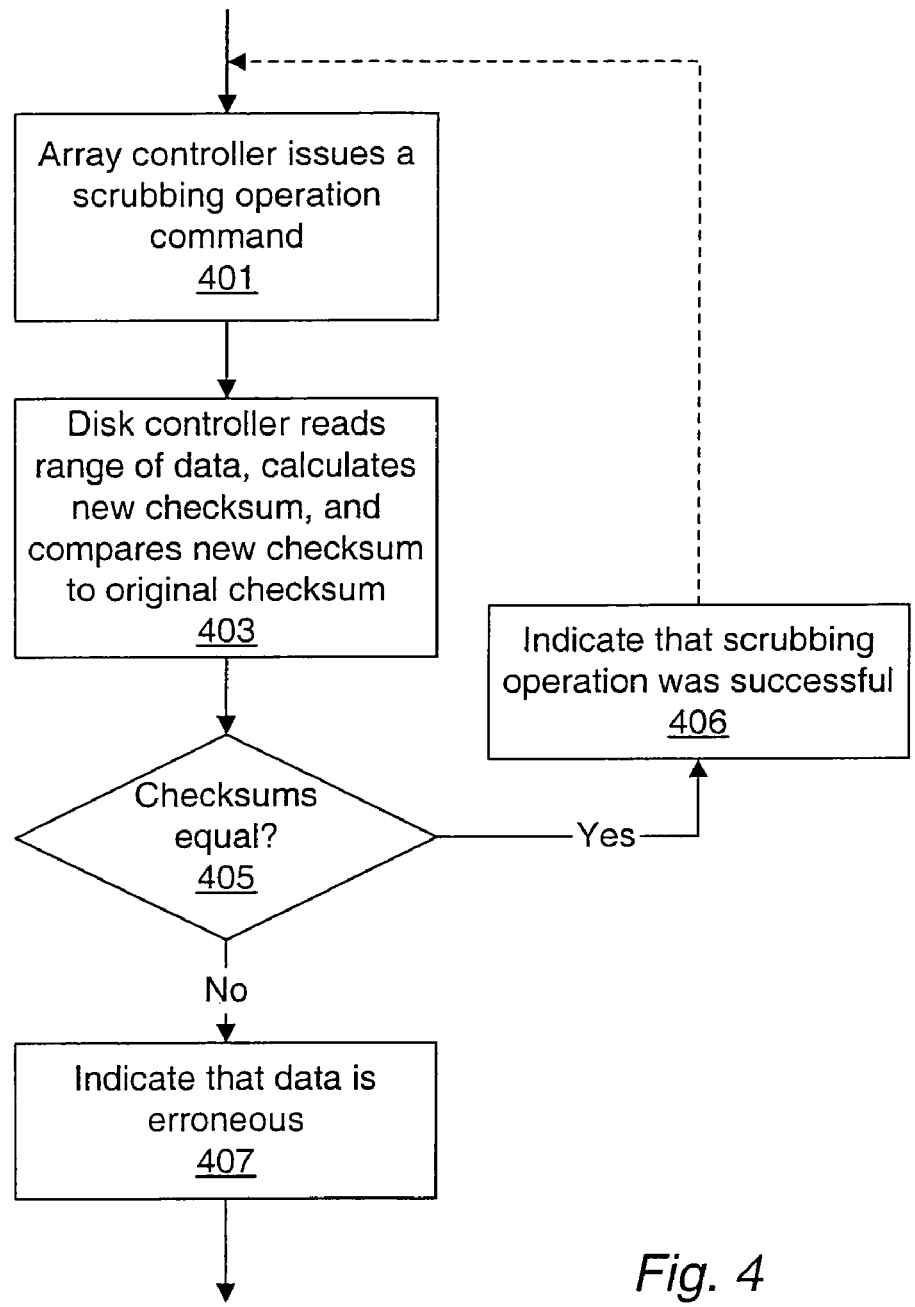
FIG. 4 shows a method of performing a data scrubbing operation according to one embodiment.

FIG. 4 shows one embodiment of a method for performing scrubbing operations at the disk controller level. At 401, an array controller issues a scrubbing operation command to a disk controller. The scrubbing operation command may specify a range of data to be scrubbed. For example, in one embodiment, the array controller may specify the range of data to be scanned by specifying the starting address and the number of blocks or bytes of data to be scanned. Additionally, in some embodiments, the scrubbing operation command may specify one or more checksums that correspond to the specified range of data. For example, if the range of data to be scrubbed spans several units, the array controller may specify all the checksums for those units in the scrubbing operation command. Alternately, the array controller may issue one scrubbing operation command per unit of data and specify a corresponding checksum with each scrubbing operation command.

In step 403, the disk controller may read a range of data (e.g., the range specified in the scrubbing operation command, if a range was specified), calculate new checksum(s) for that range of data, and compare the new checksum(s) to the original checksum(s) for that range of data. If the new and original checksums are not equal, the disk controller may respond to the scrubbing operation command. For example, the disk controller may respond by indicating that the data within that range is erroneous, as shown at 407. Additionally, in some embodiments, the disk controller may also indicate the address of the erroneous data. If the new and original checksums are equal, the disk controller may indicate that the data within that range is not erroneous and/or that the scrubbing operation was performed successfully, as shown at 406. In some embodiments, after one scrubbing operation is performed successfully, the array controller may continue to occasionally initiate additional scrubbing operations. The disk controller may indicate that the data within that range is erroneous or not erroneous by returning a success or failure indication to the array controller in some embodiments.

In some embodiments, by implementing the scrubbing operations at the disk controller level instead of the array controller level, scrubbing operations can be performed without transferring the data to be scrubbed over the interconnect. Instead, the data being scrubbed may only be transferred from the disk drive to the disk controller. Consequently, a storage array may be able to reduce the performance degradation that may occur during scrubbing operations performed at the array controller level. Additionally, in embodiments where there is little or no data being transferred over the interconnect, data on multiple disks may be scrubbed in parallel. For example, an array controller may issue multiple scrubbing operation commands in parallel to several disk controllers, causing multiple disk controllers to perform scrubbing operations at the same time.

Figure 5A:
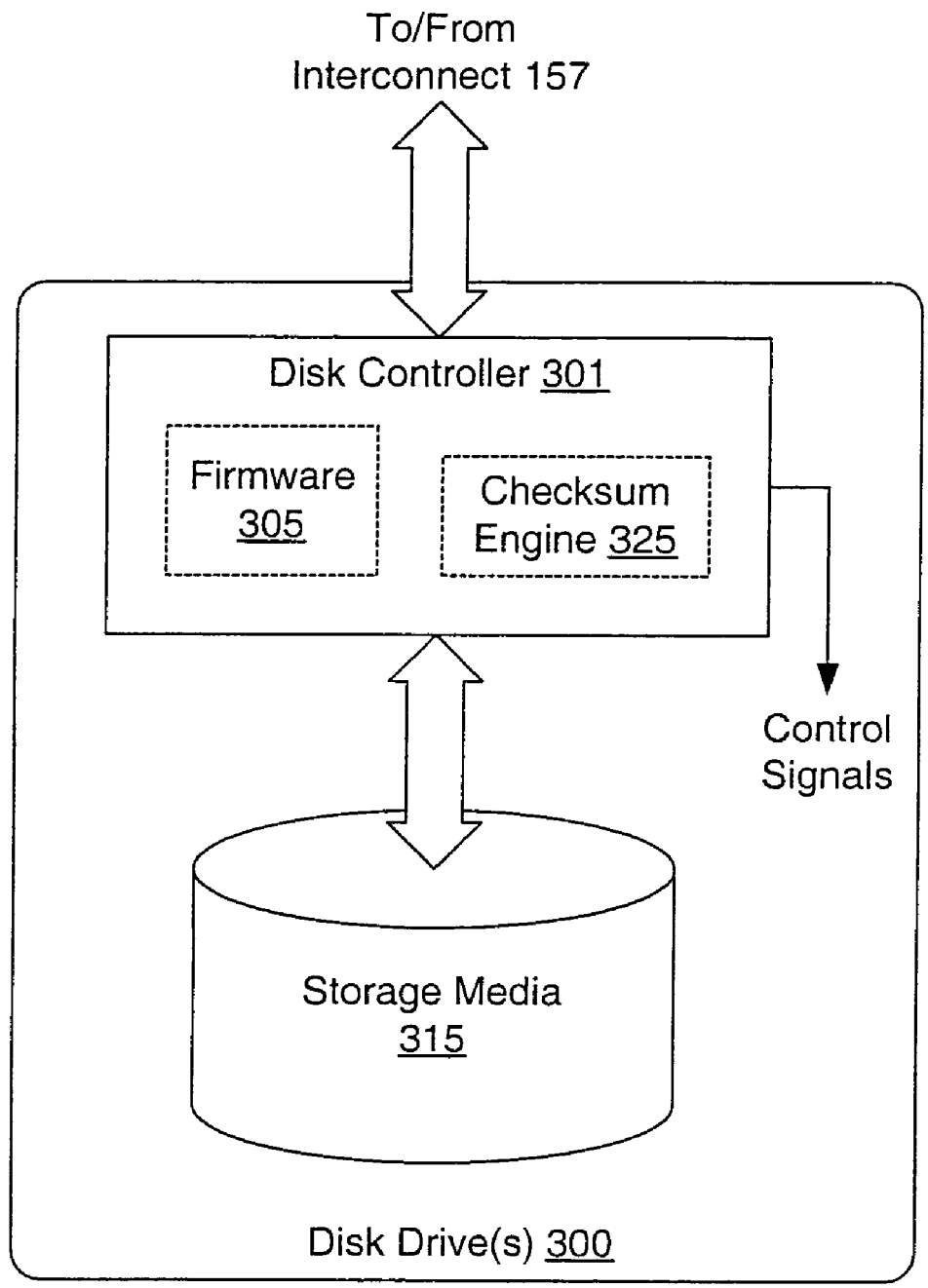
FIG. 5A illustrates a disk having a disk controller configured according to one embodiment.

In order to implement scrubbing operations at the disk controller level, some embodiments may employ disk controllers that are modified so that they can perform scrubbing operations. FIG. 5A shows one embodiment of a disk drive 300. The disk drive shown in FIG. 5B includes the storage media 315 on which data is stored and a controller 301. For clarity, other disk drive components such as the spindle motor, the actuator, etc. are not shown. The disk controller 301 may be implemented on the logic board (not shown) of the disk drive 300 and may be configured to, among other things, generate control signals that control the spindle motor and the actuator so that various areas of the storage media 315 can be accessed. The disk controller 301 may also manage read and write operations to the storage media 315. In some embodiments, the disk controller 301 may also be configured to manage an internal cache, prefetch data from the storage media 315, or implement power management features. In some embodiments, software instructions for the disk controller 301 may be implemented in firmware 305 (i.e. software stored on a non-volatile memory such as a ROM (Read Only Memory), PROM (Programmable ROM), EPROM (Erasable PROM) or EEPROM (Electrically Erasable PROM)). Furthermore, a disk controller 301 may be configured to receive read and write commands from a storage array controller and to access storage media 315 in response to those received commands.

In one embodiment, modifying a disk controller such as the disk controller 301 may involve reprogramming that disk controller's firmware 305 to enable it to recognize a scrubbing operation command, to read a specified range of data from storage media 315, to calculate checksums using the same checksum method as the array controller and/or file system, and to compare the checksums it calculates to the checksums calculated by the array controller and/or file system. In another embodiment, modifying a disk controller may involve modifying or replacing hardware in the disk controller. For example, in one embodiment, a checksum engine 335 may be included in a modified disk controller.

Figure 5B:
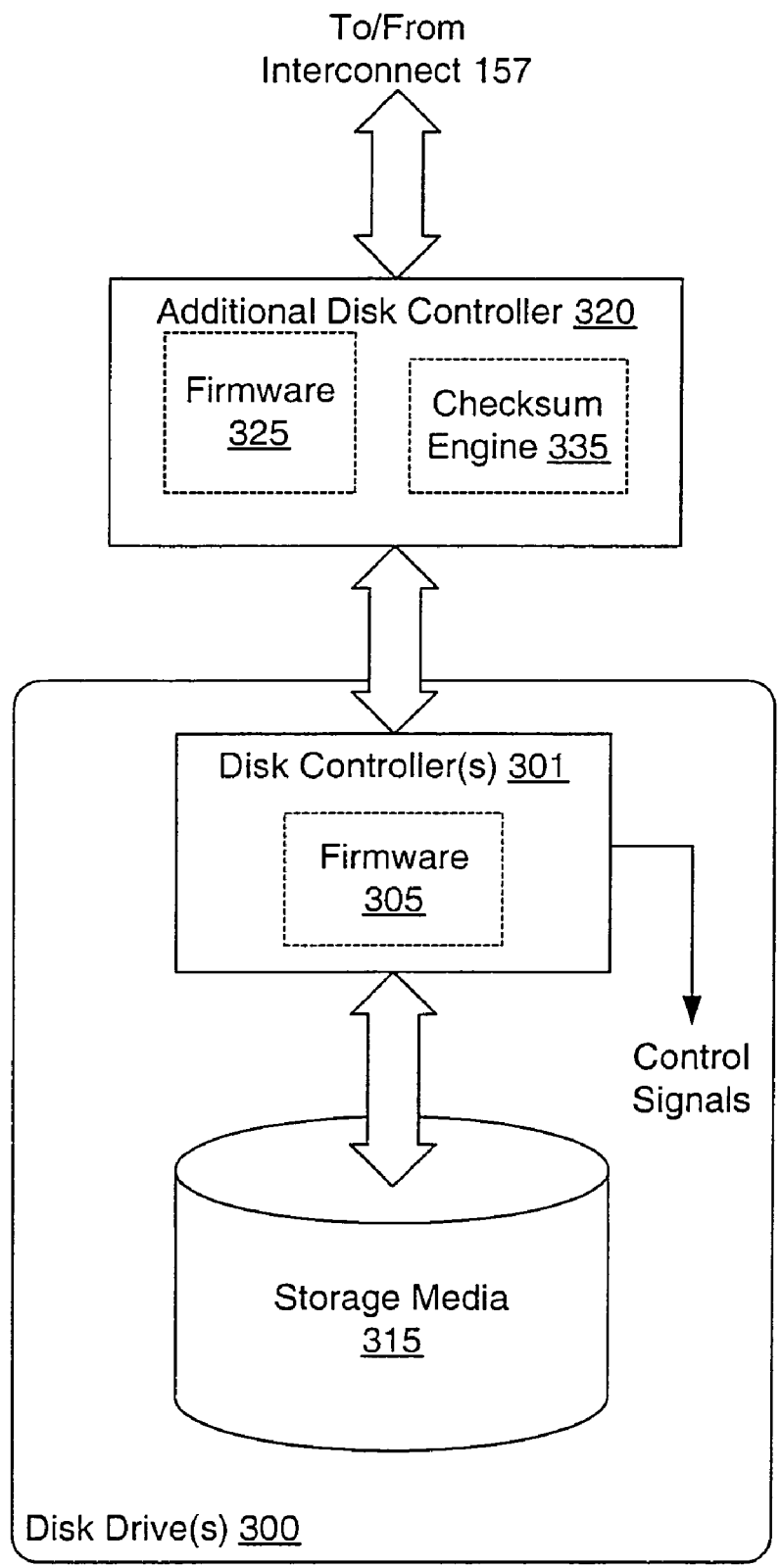
FIG. 5B illustrates a disk having two levels of disk controllers according to another embodiment.

In some embodiments, making modifications to a disk controller may be impractical. For example, a storage array manufacturer may not be the manufacturer of the disk drives used in the storage array. In these embodiments, it may be more practical to modify a disk controller by inserting another disk controller between the disk drive and the storage array. FIG. 5B shows an example of such an embodiment. The additional disk controller 320 is coupled between the disk drive 300 and the storage array. The additional disk controller 320 may be configured to recognize a scrubbing operation command, to read a specified range of data from storage media 315, to calculate checksums using the same checksum method as the array controller and/or file system, and to compare the calculated checksum to the checksum calculated by the array controller and/or file system. In one embodiment, the additional disk controller 320 may include hardware configured to perform parts of the scrubbing operation. For example, the disk controller 320 may include a checksum engine 335 configured to calculate checksums. In another embodiment, the additional disk controller may include firmware 325 programmed to implement the scrubbing operation. Other embodiments of the additional disk controller may employ combinations of hardware and software to implement the data scrubbing operation. Furthermore, in some embodiments, the additional disk controller 320 may be coupled to multiple integrated disk controllers so that the additional disk controller 320 can, for example, implement scrubbing operations on multiple disks drives.

While implementing the scrubbing operation at the disk controller-level may improve system performance, inefficiencies may still remain. Furthermore, in some embodiments, it may be desirable to improve the efficiency of storage array controller-level scrubbing operations. For example, an array controller may calculate a checksum for every block of data. In a large storage array, there may be a large number of these block-level checksums, and the array controller may have to access and specify each of these checksums when issuing or performing scrubbing operation commands. Furthermore, an array or disk controller may be able to read data from a disk drive more efficiently for larger amounts of data, and block-level scrubbing operations may not take sufficient advantage of this added efficiency.

Figure 6:
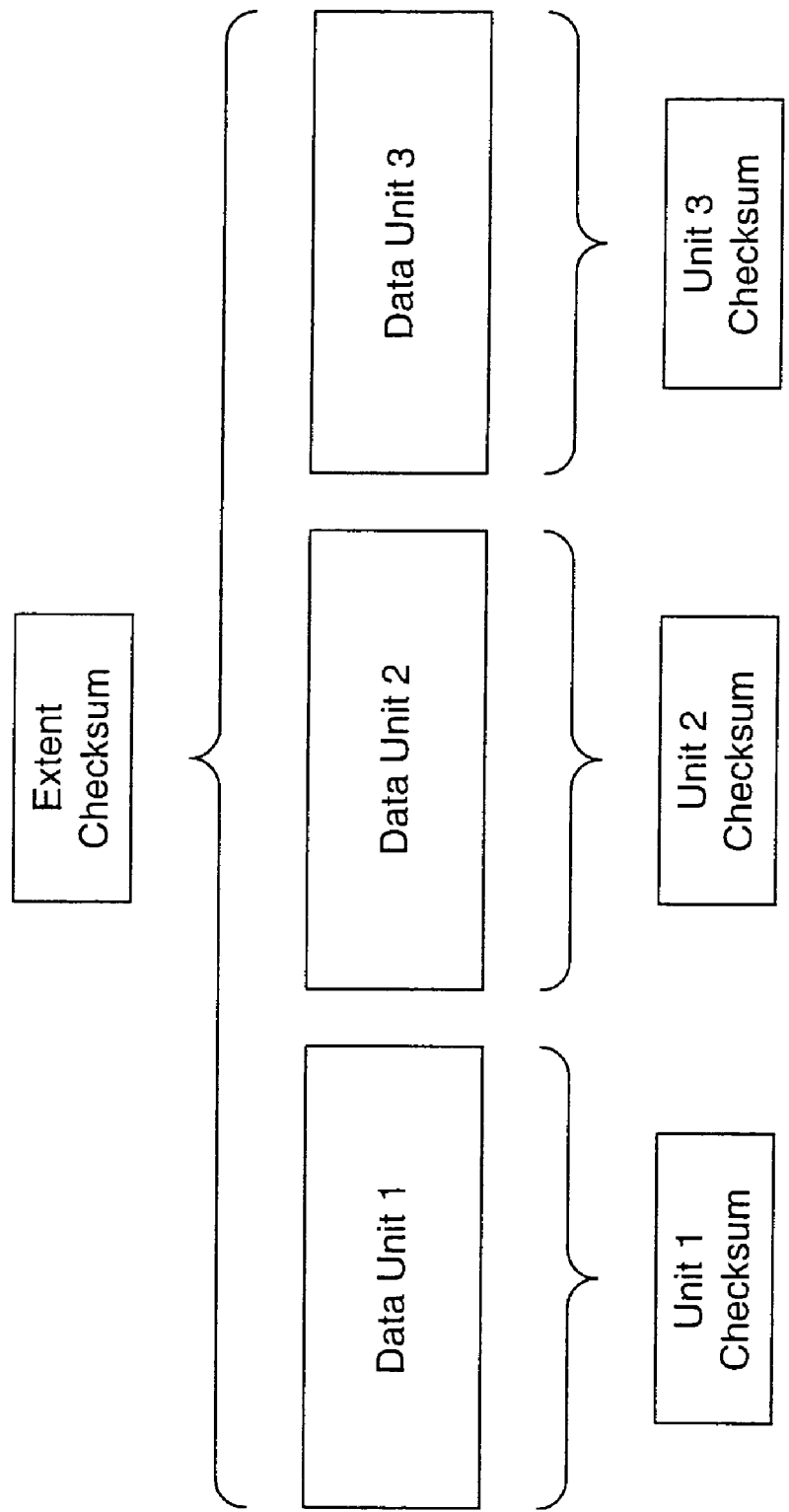
FIG. 6 illustrates one embodiment of multiple levels of checksums.

In some embodiments, storage arrays employing scrubbing operations may use multiple levels of checksums for the same ranges of data. For example, in one embodiment, a storage array may implement multiple levels of checksums in order to increase its efficiency. FIG. 6 shows one example of two such levels of checksums, where the two levels are divided into unit and extent checksums. In FIG. 6, each unit of data has a corresponding unit checksum. In various embodiments, units of data may have various sizes such as bytes and blocks. Additionally, an extent checksum has been computed over the extent of data ranging from unit 1 to unit 3.

Generally, an extent may be any size greater than or equal to a unit. For example, in some embodiments, each extent may span a multi-unit data range. Furthermore, in one embodiment, each extent may span a constant number of units (i.e., each extent may include the same number of units). In embodiments wherein scrubbing operations are performed at the disk controller level, an array controller or host computer system may be configured to use extent checksums when performing scrubbing operations. Since the extent checksum may correspond to a larger range of data than the unit checksums, in some embodiments an array controller or host may be able to issue fewer scrubbing operation commands to scrub a given extent of data than the array controller or host would have to issue using unit-level checksums. If a larger amount of data is read when computing an extent checksum, using extent checksums may also take advantage of a disk controller's higher efficiency when reading larger amounts of data.

Having multiple levels of checksums may also improve the efficiency of scrubbing operations in embodiments where the scrubbing operations are performed at the array controller or host level. For example, if an extent checksum corresponds to a larger amount of data than a unit checksum, the array controller or host may be able to access fewer extent checksums to scrub a certain amount of data than it would access if unit checksums were being used. Also, there may be efficiency gains due to reading larger amounts of data at a time, so if larger amounts of data are verified by extent checksums than by unit checksums, scrubbing operation efficiency may be increased by using extent checksums when performing scrubbing operations.

Figure 7A:
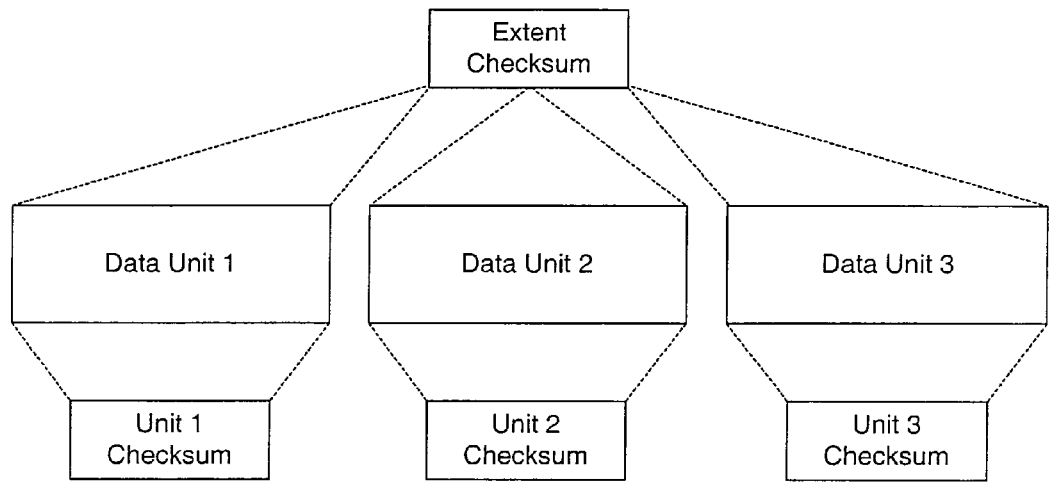
FIG. 7A shows another embodiment of multiple levels of checksums.
Figure 7B:
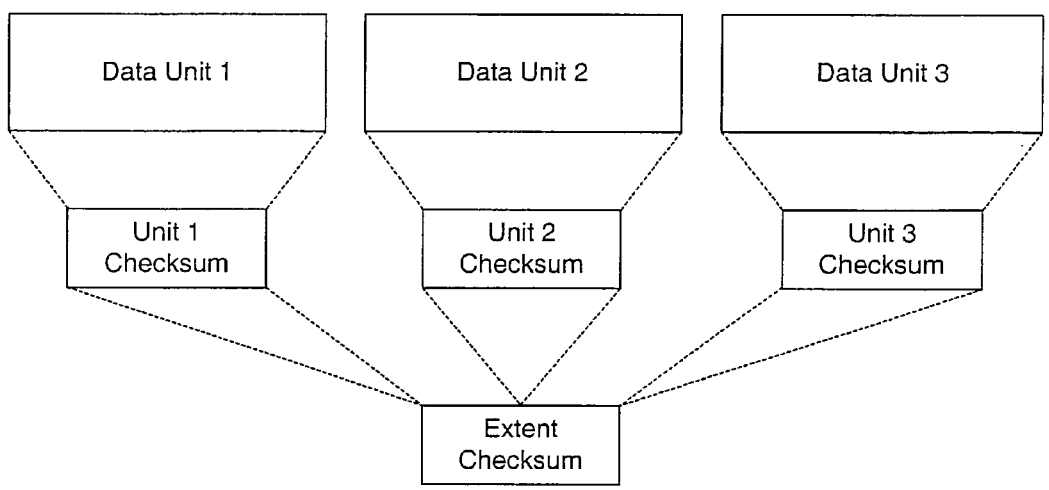
FIG. 7B shows yet another embodiment of multiple levels of checksums.

FIG. 7A shows one embodiment of multiple levels of checksums. In this embodiment, the extent checksum is calculated directly from the extent of data it verifies. Because the extent checksum is calculated directly from the data (as opposed to being calculated from the unit checksums for that data as shown in FIG. 7B), a different checksum algorithm may be used when calculating the extent checksum than when calculating the unit checksums for the same extent of data. Since the cost of calculating and storing an extent checksum is amortized over a larger amount of data than the cost of calculating and storing a unit checksum, some embodiments may efficiently calculate the extent checksum using a "stronger" checksum technique than is used to calculate the corresponding unit checksums. For example, in storage arrays that maintain block checksums, the block checksums may only be able to detect errors under a certain threshold, such as single-bit errors. Thus, in some embodiments, it may be desirable for the extent checksum to use a more robust checksum algorithm (e.g., one that has a higher error detection threshold). For example, in some embodiments, the extent checksum may be a Reed-Solomon code.

In embodiments where the extent checksum is calculated directly from the data it verifies, the array controller may cache or store the extent checksums and perform additional reads and writes to the cache or storage location in order to access those extent checksums. Thus, one disadvantage of these embodiments is that if the array controller caches or stores both extent and unit checksums, a larger memory or storage area may be used to hold all the checksums than would be used in an embodiment where only unit checksums were cached or stored. In one embodiment, the array controller may cache the extent checksum in order to reduce the amount of time taken to access the extent checksum when initiating a scrubbing operation.

In many embodiments, the amount of memory available to cache or store checksums may be limited, and if multiple levels of checksums are used, this memory limitation may affect how the multiple levels of checksums are implemented. In some embodiments, in order to be able to cache or store the necessary extent checksums, either the size or the number of extent checksums may be limited. The number of extent checksums may depend, in part, on the amount of data each checksum verifies. For example, some embodiments may reduce the number of checksums by increasing the size of each extent. However, the size of each extent checksum may also depend, in part, on the size of each extent in some embodiments. For example, when using certain checksum algorithms, increasing the size of the extent may increase the size of the extent checksum. Also, the size of each extent checksum may be related to the type of checksum algorithm used to calculate it. For example, the robustness (i.e., the error detecting ability) of the checksum algorithm may have an effect on the size of the checksum in some embodiments. Consequentially, in embodiments where the amount of memory available is the limiting factor, the size of each extent of data and the robustness and type of the extent checksum may depend on the memory used to cache or store the extent checksums. In other embodiments, the robustness and type of checksum algorithm and size of each extent may affect the size of the memory implemented to cache or store the checksums.

In embodiments where the array controller caches or stores the extent checksums (as opposed to embodiments where the array controller calculates the extent checksums on the fly, as described below with respect to FIG. 7B), the array controller may be able to reduce how often it accesses the unit checksums for data units that are rarely accessed by the file system. For example, an array controller that caches or stores both unit checksums and extent checksums may only access the unit checksums during file system accesses and scrubbing operations. If the file system is rarely accessing a particular range of data, the array controller may not access the unit checksum(s) for that data very frequently. Thus, since the array controller can use the extent checksums instead of the unit checksums when performing or issuing scrubbing operation commands, its accesses to the unit checksums may be greatly reduced. Furthermore, regardless of the frequency of file system accesses to a particular range of data, it may still be more efficient for the array controller to access a single extent checksum when scrubbing an extent of data than for the array controller to access all of the unit checksums for that extent of data.

FIG. 7B shows a different embodiment of multiple levels of checksums. In this embodiment, the extent checksum is calculated from the unit checksums corresponding to the data units that make up the extent of data. For example, if each unit checksum is an XOR checksum calculated over a block of data, the extent checksum may be calculated by simply XORing the block XOR checksums together. In embodiments where the unit checksums are already being maintained by the array controller, the array controller may be able to calculate the extent checksum on the fly as it performs or issues scrubbing operation commands (as opposed to calculating and storing the extent checksum as the data is written to the storage array). When the scrubbing operation is performed, the extent checksum calculated on the fly from the unit checksums may be compared to an extent checksum calculated directly from the data being scrubbed. Thus, in this embodiment, an array controller may not maintain extent checksums, allowing the size of the cache or storage area used to store the checksums to be reduced.

In embodiments where extent checksums are calculated from the unit checksums, some embodiments may vary the size of the extent of data over which the extent checksums are calculated. For example, an extent checksum may be calculated using a variable number of unit checksums each time the array controller performs or issues a scrubbing operation command. As mentioned earlier, a disk controller's efficiency may increase as the disk controller accesses more data. Thus, the more data accessed at a time, the less time per amount of data required for the access. However, even though the disk controller may be more efficient, it will still take longer for it to access a larger amount of data than a smaller amount. While a disk controller is accessing data from a disk drive, the disk controller may be unavailable to handle other accesses generated by the array controller or the file system. Because a disk controller's unavailability may have an undesirable effect on the storage array's performance, it may be undesirable to have a disk controller occupied by scrubbing operations for extended, unbroken time periods. For this reason, some embodiments may vary the amount of the data to be verified in a scrubbing operation by balancing the efficiency gained from reading a larger data unit against the performance concerns raised by having a disk controller occupied for a longer uninterrupted time period. Since the extent checksum may be calculated on the fly, the array controller may vary the size of the extent of data to be verified during each scrubbing operation. Furthermore, the amount of data scrubbed on any given disk at any given time may vary depending on the traffic to and from the storage array or even to and from specific disks within the storage array.

In embodiments using multiple levels of checksums, additional scrubbing operations may be performed if an error is detected in an initial scrubbing operation. For example, if the array controller issues a scrubbing operation command to a disk controller and specifies a relatively large extent of data, and if the disk controller finds an error during execution of the scrubbing operation, one or more additional scrubbing operations may be initiated on units of data within the extent to more specifically locate the source of the error. Similarly, if an array controller or host system is performing a scrubbing operation using extent checksums, the array controller or host system may use additional scrubbing operations and unit checksums to pinpoint errors within the extent. Additionally, in some embodiments, more than two levels (e.g., extent and unit) of checksums may be used. For example, one embodiment may use a three-level checksum scheme.

Figure 8:
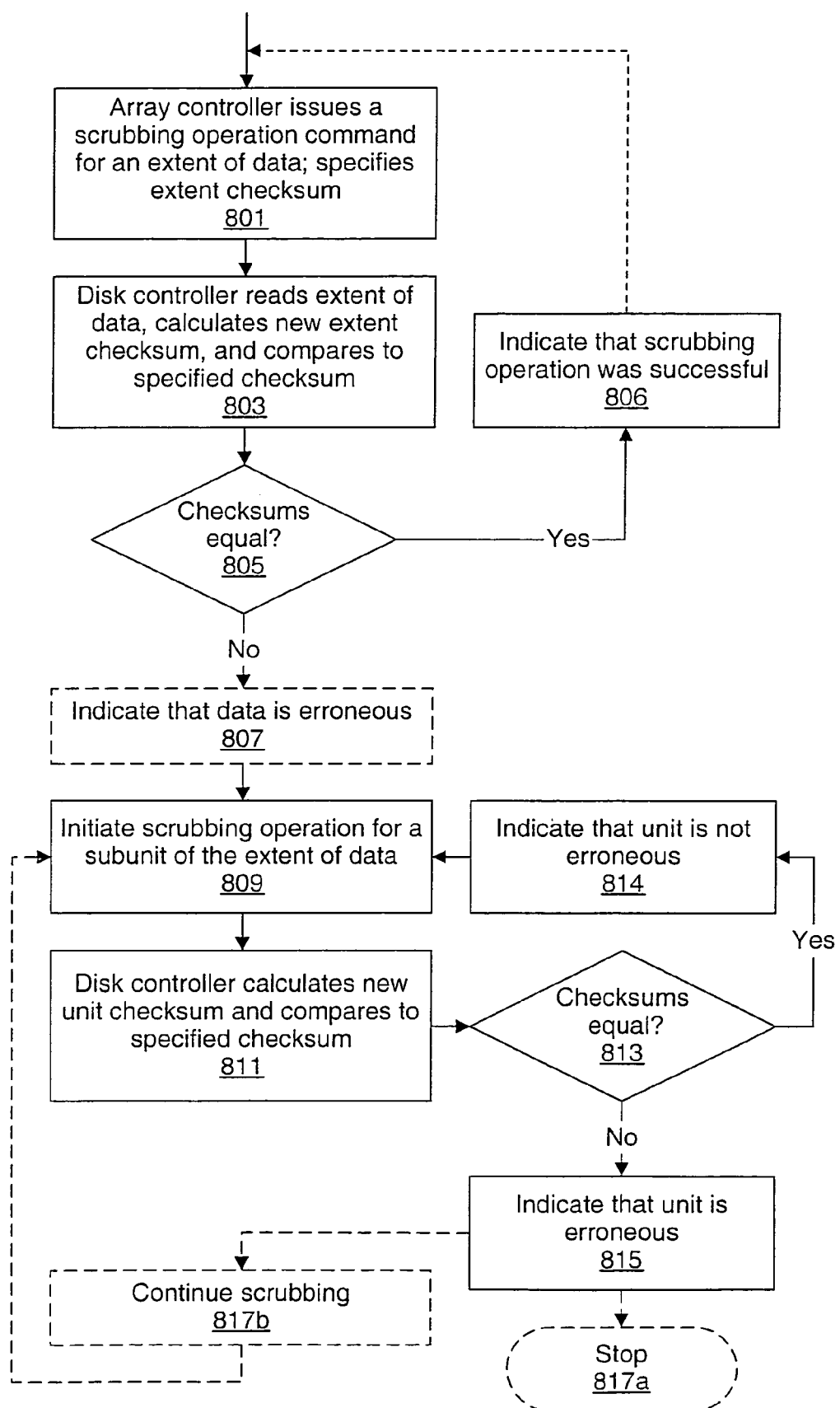
FIG. 8 illustrates another embodiment of a method of performing a data scrubbing operation.

FIG. 8 shows a method of performing scrubbing operations using multiple levels of checksums according to one an embodiment. In FIG. 8, an array controller issues a scrubbing operation command to a disk controller, as shown at 801. In some embodiments, such as the one illustrated in FIG. 8, the scrubbing operation command may also specify a range of data to be scrubbed and/or the extent checksum for the specified range of data. For example, if the array controller calculates the extent checksum from the unit checksums for the units of data within the extent, the array controller may calculate the extent checksum on the fly when issuing the scrubbing operation command. In step 803, the disk controller may read the specified range of data, calculate a new extent checksum for that specified range of data, and compare the new checksum to a preexisting checksum (e.g., a checksum specified by the array controller). In one embodiment, if the two checksums are equal, the disk controller may indicate that the data within that range is not erroneous and/or that the scrubbing operation was performed successfully, as shown at 806. In some embodiments, the scrubbing operation may then be completed. In other embodiments, however, the array controller may continue to initiate additional scrubbing operations occasionally.

If the two checksums are not equal, additional scrubbing operations may be initiated, as shown at 809. In one embodiment, a disk controller may initiate additional scrubbing operations independently of the array controller in response to detecting an error in an extent. For example, the disk controller may initiate additional scrubbing operations by reading one or more block or byte checksums for one or more blocks or bytes of data within the extent. Then, the disk controller may perform additional block or byte scrubbing operations until the error or errors within the extent have been pinpointed.

In another embodiment, if the new extent checksum does not equal the preexisting extent checksum, the disk controller may respond to the issuer of the scrubbing operation command, as shown in 807. For example, the disk controller may indicate that the data within that range is erroneous. After receiving an indication from a disk controller that an error occurred in a given extent of data, an array controller may initiate other scrubbing operations for the units of data within that extent using the unit checksums. For example, if data within a given extent is determined to be erroneous, an array controller may initiate a second phase of scrubbing operations for the units of data making up that extent in order to better pinpoint the erroneous data. Thus, at 809, the array controller may issue a scrubbing command for a unit of data within the extent. In embodiments where the array controller caches or stores the unit checksums, the array controller may also specify the unit checksum. The disk controller may then calculate a checksum for the specified unit and compare the calculated checksum to the original checksum for that unit, as shown at 811. If the checksums are equal, then the disk controller may indicate that unit of data is not erroneous, at 814. In response, the array controller may continue scrubbing other data units within that extent until an error is found. In one embodiment, once an erroneous data unit is found, the array controller may stop issuing additional unit scrubbing operation commands, as shown at 817a. Alternately, in another embodiment, the array controller may continue issuing unit scrubbing operation commands, as indicated at 817b, until all of the units within the extent have been scrubbed. Once the erroneous unit(s) have been identified, the array controller may initiate an alarm, initiate a reconstruction attempt of the data, perform further analysis of the error, etc.

Figure 9:
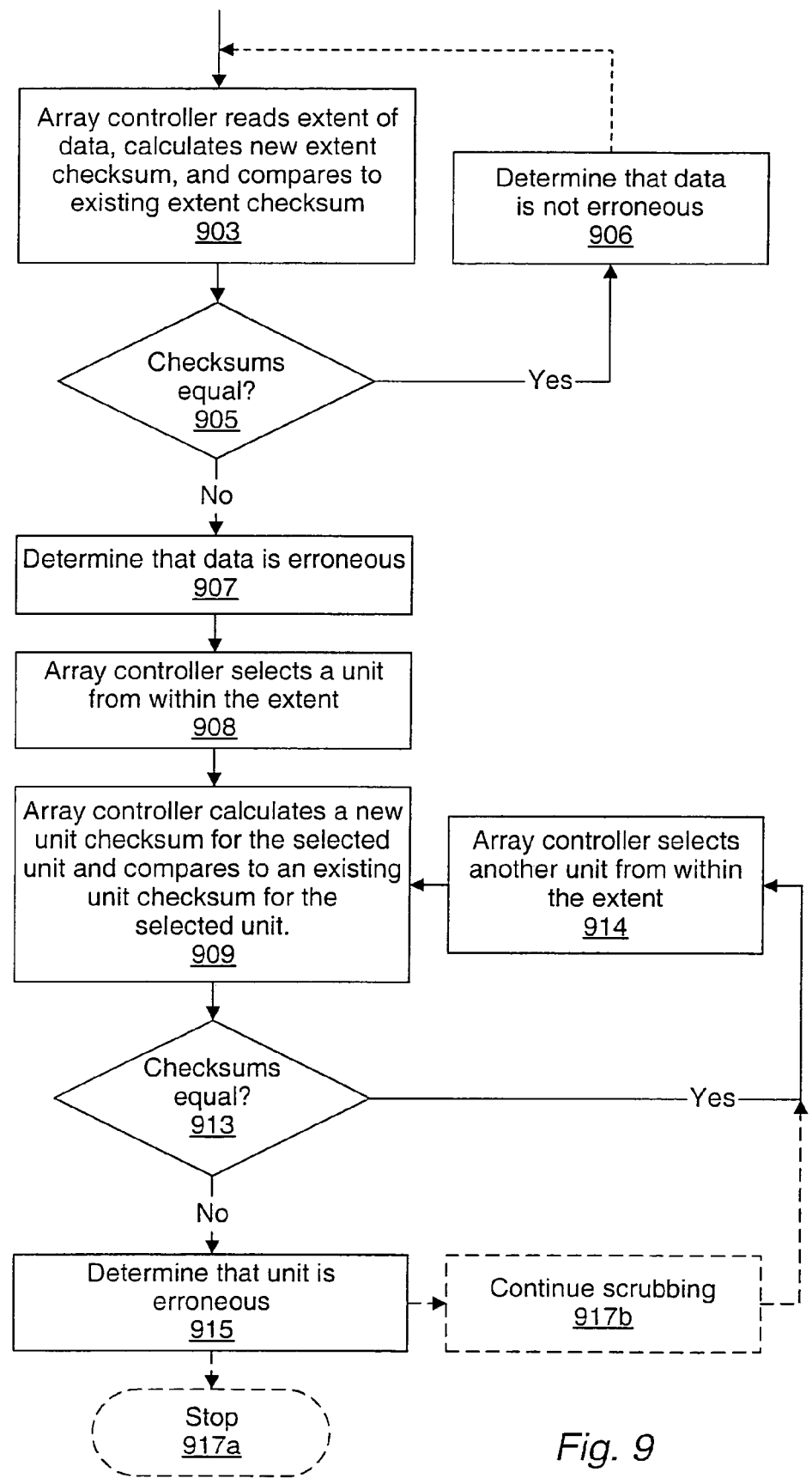
FIG. 9 illustrates yet another embodiment of a method of performing a data scrubbing operation.

Multiple levels of checksums may also be implemented in a storage system that does not implement disk controller-level scrubbing operations. For example, a storage array that has array controller-level scrubbing operations may use multiple levels of checksums. FIG. 9 shows one example of such an embodiment. At 903, the array controller may read an extent of data, calculate a new extent checksum, and compare the new extent checksum to an existing extent checksum. The existing checksum may be maintained (e.g., cached or stored) by the array controller in some embodiments. For example, the existing checksum may be computed and cached by the array controller when the data is written to the storage array. In one embodiment, the extent checksum may be computed using a stronger checksum algorithm than the algorithm used to compute unit checksums for the units of data within that extent.

If the existing and new extent checksums are equal, the array controller may determine that the date within that extent is not erroneous, at 906. In some embodiments, the array controller may then be finished. In other embodiments, however, the array controller may continue to occasionally initiate extent scrubbing operations.

If the existing extent checksum and the new extent checksum differ, the array controller may determine that the data within that extent is erroneous, as shown at 907. The array controller may then perform scrubbing operations on smaller data ranges within the extent using the lower level of checksums in order to better pinpoint the erroneous data. For example, at 908, the array controller may select a unit of data within the extent, and at 909 the array controller may calculate a unit checksum for that data and compare it to an existing unit checksum. If the checksums are equal, the array controller may determine that unit is not erroneous and continue scrubbing additional units within the extent, as indicated at 914. Once an erroneous unit is located, the array controller may stop initiating additional unit scrubbing operation commands, as indicated in 917a. Alternately, in another embodiment, the array controller may continue issuing unit scrubbing operation commands, as shown at 917b, until all of the units within the extent have been scrubbed.

In one embodiment, the term disk drive may refer to any semi-permanent or permanent storage place for digital data, as opposed to a temporary workspace for executing instructions and processing data (e.g. a random access memory (RAM)). A disk drive may be any peripheral storage device that holds, spins, reads and writes magnetic or optical disks or any other suitable mass storage media, including solid-state media and magnetic tape media. A disk drive may be a receptacle for disk or tape cartridges, tape reels, disk packs or floppy disks, or it may contain non-removable disk platters like most personal computer hard disks. In some embodiments, disk drives may be limited to disk-type storage media.

Furthermore, it is noted that a storage array may refer to many different storage systems. For example, in some embodiments, a storage array may simply refer to a JBOD (Just a Bunch of Disks) array, whereas in another embodiment, the same description may refer to a RAID array.

Numerous variations and modifications will become apparent to those skilled in the art once the above disclosure is fully appreciated. It is intended that the following claims be interpreted to embrace all such variations and modifications.

What is claimed is:

1. A storage system comprising:
   a storage array controller; and
   a storage array coupled to the storage array controller and comprising:
   a plurality of disk drives; and
   a plurality of disk drive controllers, wherein each disk drive controller is configured to control one or more of the disk drives;
   wherein the storage array controller is configured to control accesses to data within the storage array;
   wherein the storage array controller is further configured to issue a first scrubbing operation command to a first disk drive controller;
   wherein the first disk drive controller is configured to receive the first scrubbing operation command from the storage array controller and, in response to receiving the first scrubbing operation command, to read data from within a data range from at least one of the disk drives, to calculate a new checksum for the data, and to compare the new checksum to a preexisting checksum for the data; and
   wherein if the new checksum differs from the preexisting checksum, the first disk drive controller is further configured to respond to the first scrubbing operation command by indicating that the data within the data range is erroneous.

2. The storage system of claim 1, wherein the storage array controller is configured to specify the data range in the first scrubbing operation command.

3. The storage system of claim 2, wherein the storage array controller is configured to specify the data range by specifying a starting address of the data range and a number of blocks within the data range.

4. The storage system of claim 1, wherein the storage array controller is further configured to initiate a reconstruction attempt of the erroneous data in response to the first disk drive controller indicating that the data is erroneous.

5. The storage system of claim 1, wherein the first disk drive controller is further configured to respond to the first scrubbing operation command by indicating an address of the erroneous data.

6. The storage system of claim 1, wherein the storage array controller is further configured to calculate the preexisting checksum for the data when the data is written to the storage array.

7. The storage system of claim 1, wherein the storage array controller is configured to specify the preexisting checksum in the first scrubbing operation command.

8. The storage system of claim 1, wherein the storage array controller is further configured to receive the preexisting checksum for the data from a host computer system when the host computer system writes the data to the storage array.

9. The storage system of claim 1, wherein the storage array controller is further configured to maintain the preexisting checksum in a cache coupled to the storage array controller.

10. The storage system of claim 1, wherein the first disk drive controller comprises a checksum engine configured to calculate the new checksum.

11. The storage system of claim 1, wherein the first disk drive controller is further configured to indicate that a scrubbing operation was successful if the new checksum equals the preexisting checksum.

12. The storage system of claim 1, wherein the storage array controller is further configured to issue multiple scrubbing operation commands in parallel to multiple ones of the disk drive controllers.

13. The storage system of claim 1, wherein the storage array controller is implemented in software running on a host computer system.

14. The storage system of claim 1, wherein the first disk drive controller comprises at least one second disk drive controller integrated with the at least one of the disk drives and a third disk drive controller coupled between the storage array controller and the at least one second disk drive controller, wherein the at least one second disk drive controller is configured to read the data within the data range from the at least one of the disk drives and to provide the data to the third disk drive controller, and wherein the third disk drive controller is configured to calculate the new checksum.

15. The storage system of claim 1, wherein the storage array controller is further configured to store the preexisting checksum in a checksum location that is independent of a location where the data within the data range is stored.

16. The storage system of claim 1, wherein the data range is a multi-unit data range, and wherein the storage array controller is further configured to calculate the preexisting checksum directly from the data in the multi-unit data range.

17. The storage system of claim 1, wherein the first data range is a multi-unit data range, and wherein the storage array controller is further configured to calculate the preexisting checksum as an extent checksum computed from a plurality of unit checksums that each correspond to a unit within the multi-unit data range.

18. The storage system of claim 17, wherein the multi-unit data range is a multi-byte data range.

19. The storage system of claim 17, wherein the multi-unit data range is a multi-block data range.

20. The storage system of claim 17, wherein the storage array controller is further configured to calculate the preexisting checksum from the plurality of first unit checksums when issuing each scrubbing operation command.

21. The storage system of claim 1, wherein the storage array controller is further configured to issue a second scrubbing operation command to the first disk drive controller in response to the first disk drive controller indicating that the data within the data range is erroneous, and wherein, in response to receiving the second scrubbing operation command, the first disk drive controller is configured to read second data within a second data range, calculate a new second checksum for the second data within the second data range, and to compare the new second checksum to a preexisting second checksum, wherein the second data range is a subset of the first data range.

22. The method of claim 21, wherein a storage array controller is further configured to specify the second data range and the second preexisting checksum in the second scrubbing operation command.

23. A method of performing scrubbing operation in a storage array, comprising:
    a storage array controller issuing a first scrubbing operation command to a disk controller;
    in response to receiving the first scrubbing operation command, the disk controller reading the data within a first data range, computing a new first checksum for the data within the first data range, and comparing the new first checksum to an original first checksum for the first data range; and
    if the new first checksum differs from the original first checksum, the disk controller indicating that the data within the first range is erroneous.

24. The method of claim 23, wherein the first scrubbing operation command specifies the first data range.

25. The method of claim 24, wherein the first scrubbing operation command specifies the first data range by specifying a starting address of the first data range and a number of blocks within the first data range.

26. The method of claim 23, wherein said responding further comprises indicating an address of the erroneous data.

27. The method of claim 23, further comprising initiating a reconstruction attempt of the erroneous data in response to said indicating.

28. The method of claim 23, further comprising the storage array controller issuing a second scrubbing operation command to the disk controller in response to said indicating.

29. The method of claim 28, wherein the second command specifies a second data range and an original second checksum for data within the second data range, and wherein the second data range is a subset of the first data range.

30. The method of claim 29, further comprising the disk controller computing a new second checksum for the second data range, comparing the new second checksum to the original second checksum, and indicating that the data within the second data range is erroneous if the new second checksum does not equal the original second checksum.

31. The method of claim 28, further comprising calculating the original first checksum using a first checksum algorithm and calculating the original second checksum using a second checksum algorithm, wherein the first checksum algorithm is a stronger checksum algorithm than the second checksum algorithm.

32. The method of claim 28, further comprising the storage array controller issuing a plurality of additional scrubbing operation commands to the disk controller in response to said indicating, wherein the first data range is a multi-unit data range, and wherein each additional scrubbing operation command specifies a unit of data within the first data range.

33. The method of claim 23, further comprising the disk controller indicating that the scrubbing operation was successful if the new first checksum equals the original first checksum.

34. The method of claim 23, further comprising the storage array controller issuing a plurality of first scrubbing operation commands in parallel to a plurality of disk controllers.

35. The method of claim 23, wherein said issuing further comprises the storage array controller providing the original first checksum to the disk controller.

36. The method of claim 23, further comprising:
a host computer system writing the data within the first data range of the storage array, wherein said writing comprises the host computer system providing the original first checksum; and
storing the original first checksum within the storage array in response to said writing.

37. The method of claim 23, further comprising the storage array controller calculating the original first checksum in response to the data within the first data range being written to the storage array by a host computer system.

38. The method of claim 37, wherein said calculating the original first checksum comprises calculating the original first checksum from the data within the first data range.

39. The method of claim 23, wherein the storage array controller is implemented in software running on a host computer system.

40. The method of claim 23, wherein the disk controller comprises at least one first disk controller integrated with a disk drive and a second disk controller coupled between the storage array controller and the at least one first disk controller, wherein the at least one first disk controller is configured to read the data within the first data range from the disk drive and to provide the data to the second disk controller, and wherein the second disk controller is configured to calculate the new first checksum.

41. The method of claim 23, further comprising calculating the original first checksum and storing the original first checksum in a checksum location that is independent of a location where the first data within the first data range is stored.

42. The method of claim 23, wherein the first data range is a multi-unit data range, and wherein the original first checksum comprises a first extent checksum computed directly from data in the multi-unit data range.

43. The method of claim 23, wherein the first data range is a multi-unit data range, and wherein the original first checksum comprises a first extent checksum computed from a plurality of first unit checksums that each correspond to a unit within the multi-unit data range.

44. The method of claim 43, wherein the multi-unit data range is a multi-byte data range.

45. The method of claim 43, wherein the multi-unit data range is a multi-block data range.

46. The method of claim 43, further comprising the array controller calculating the first extent checksum from the plurality of first unit checksums on the fly when issuing the first scrubbing operation command.

47. A disk controller, comprising:
a first interface configured to be connected to a storage array via an interconnect;
a second interface configured to access a storage media; and
a controller configured:
to receive a scrubbing operation command via the first interface;
in response to receiving the scrubbing operation command, to read data within a range of data from the storage media;
to calculate a checksum for the data;
to compare the checksum to a preexisting checksum for the data; and
if the checksum differs from the preexisting checksum, to indicate that the data within the data range is erroneous.

48. The disk controller of claim 47, wherein the controller is configured to access the storage media by communicating the data range to an integrated disk controller coupled to the storage media and by receiving the data from the integrated disk controller.

49. The disk controller of claim 47, wherein the scrubbing operation command specifies the data range.

50. The disk controller of claim 49, wherein the scrubbing operation command specifies the data range by specifying a starting address of the data range and a number of blocks within the data range.

51. The disk controller of claim 47, wherein the controller is further configured to indicate an address of the erroneous data if the checksum differs from the preexisting checksum.

52. The disk controller of claim 47, wherein the scrubbing operation command specifies the preexisting checksum.

53. The disk controller of claim 47, further comprising a checksum engine configured to calculate the checksum.

54. The disk controller of claim 47, wherein the controller is further configured to indicate that the scrubbing operation was successful if the checksum equals the preexisting checksum.

* * * * *

UNITED STATES PATENT AND TRADEMARK OFFICE
CERTIFICATE OF CORRECTION

| | |
|---|---|
| PATENT NO. | : 7,062,704 B2 |
| APPLICATION NO. | : 09/880616 |
| DATED | : June 13, 2006 |
| INVENTOR(S) | : Nisha D. Talagala, Randall D. Rettberg and Chia Y. |

It is certified that error appears in the above-identified patent and that said Letters Patent is hereby corrected as shown below:

In the Claims:

Column 18, line 39 through column 22, line 54 and delete claims 1-54 and insert the following:

--1. A storage system comprising:

a storage array controller; and a storage array coupled to the storage array controller by an interconnect, wherein the storage array comprises a plurality of storage devices;

wherein the storage array controller is configured to write data to a first data range in the storage array, wherein the first data range comprises one or more units of data, wherein the storage array controller is further configured to initiate an extent scrubbing operation for the first data range, wherein the extent scrubbing operation comprises reading the data from the first data range from the one or more storage devices comprised in the storage array, calculating an extent checksum for the data read from the first data range, and comparing the extent checksum to a preexisting extent checksum for the first data range;

wherein if the extent checksum differs from the preexisting extent checksum, the storage array controller is further configured to initiate one or more unit scrubbing operations, wherein each unit scrubbing operation comprises calculating a new unit checksum for a first unit of data, wherein the first unit of data is comprised within the first data range, and comparing the new unit checksum to an existing unit checksum for the first unit of data.

2. The storage system of claim 1, wherein the storage array controller is further configured to determine that an error is located within the first unit of data if the new unit checksum differs from the existing unit checksum.

3. The storage system of claim 1, wherein the storage array controller is further configured to calculate a plurality of existing unit checksums for the units of data comprised within the first data range in conjunction with writing the data to the first data range.

UNITED STATES PATENT AND TRADEMARK OFFICE
CERTIFICATE OF CORRECTION

PATENT NO. : 7,062,704 B2 Page 2 of 6
APPLICATION NO. : 09/880616
DATED : June 13, 2006
INVENTOR(S) : Nisha D. Talagala, Randall D. Rettberg and Chia Y.

It is certified that error appears in the above-identified patent and that said Letters Patent is hereby corrected as shown below:

Column 18, line 39 through column 22, line 54 and delete claims 1-54 and insert the following: (cont'd)

4. The storage system of claim 1, wherein the storage array controller is further configured to initiate a unit scrubbing operation for each unit of data within the first data range.

5. The storage system of claim 1, further comprising one or more storage device controllers, wherein each storage device controller is configured to control one or more of the storage devices, wherein the storage array controller is further configured to initiate the extent scrubbing operation by issuing an extent scrubbing operation command to one or more of the storage device controllers, and wherein the one or more of the storage device controllers are configured to perform the extent scrubbing operation in response to receiving the extent scrubbing operation command by reading the data from the first data range, calculating the extent checksum, comparing the extent checksum to the preexisting extent checksum, and if the extent checksum differs from the preexisting extent checksum, indicating that the data within the first data range is erroneous to the storage array controller.

6. The storage system of claim 5, wherein the storage array controller is further configured to initiate multiple extent scrubbing operation commands by issuing multiple extent scrubbing operation commands in parallel to multiple ones of the storage device controllers.

7. The storage system of claim 1, further comprising one or more storage device controllers, wherein each storage device controller is configured to control one or more of the storage devices, wherein the storage array controller is further configured to initiate the one or more unit scrubbing operations by issuing one or more unit scrubbing operation commands to one or more of the storage device controllers, wherein the one or more of the storage device controllers are configured to perform the one or more unit scrubbing operations in response to receiving the one or more unit scrubbing operation commands by calculating the new unit checksum for the first unit of data, comparing the new unit checksum to the existing unit checksum for the first unit of data, and if the new unit checksum differs from the existing unit checksum, indicating that the first unit of data is erroneous to the storage array controller.

8. The storage system of claim 1, wherein the storage array controller is further configured to read the data from the first data range, calculate the extent checksum, and compare the extent checksum to the preexisting extent checksum.

UNITED STATES PATENT AND TRADEMARK OFFICE
CERTIFICATE OF CORRECTION

| | | |
|---|---|---|
| PATENT NO. | : 7,062,704 B2 | Page 3 of 6 |
| APPLICATION NO. | : 09/880616 | |
| DATED | : June 13, 2006 | |
| INVENTOR(S) | : Nisha D. Talagala, Randall D. Rettberg and Chia Y. | |

It is certified that error appears in the above-identified patent and that said Letters Patent is hereby corrected as shown below:

Column 18, line 39 through column 22, line 54 and delete claims 1-54 and insert the following: (cont'd)

9. The storage system of claim 1, wherein the storage array controller is further configured to initiate a reconstruction attempt of the first unit of data in response to determining that the error is located within the first unit of data.

10. The storage system of claim 1, wherein the storage array controller is further configured to calculate the preexisting checksum for the data when the data is written to the storage array.

11. The storage system of claim 1, wherein the storage array controller is further configured to receive the preexisting checksum from a host computer system when the host computer system writes the data to the storage array.

12. The storage system of claim 1, wherein the storage array controller is further configured to maintain the preexisting checksum in a cache coupled to the storage array controller.

13. The storage system of claim 1, wherein the storage array controller is further configured to perform multiple scrubbing operation commands in parallel by reading data from multiple storage devices.

14. The storage system of claim 1, wherein the storage array controller is implemented in software running on a host computer system.

15. The storage system of claim 1, wherein the storage array controller is further configured to store the preexisting checksum in a checksum location that is independent of a location where the data within the data range is stored.

16. The storage system of claim 1, wherein the data range is a multi-unit data range, and wherein the storage array controller is further configured to calculate the preexisting checksum directly from the data in the multi-unit data range.

17. The storage system of claim 1, wherein the first data range is a multi-unit data range, and wherein the storage array controller is further configured to calculate the preexisting checksum from a plurality of unit checksums that each correspond to a unit within the multi-unit data range.

UNITED STATES PATENT AND TRADEMARK OFFICE
CERTIFICATE OF CORRECTION

| | | |
|---|---|---|
| PATENT NO. | : 7,062,704 B2 | Page 4 of 6 |
| APPLICATION NO. | : 09/880616 | |
| DATED | : June 13, 2006 | |
| INVENTOR(S) | : Nisha D. Talagala, Randall D. Rettberg and Chia Y. | |

It is certified that error appears in the above-identified patent and that said Letters Patent is hereby corrected as shown below:

Column 18, line 39 through column 22, line 54 and delete claims 1-54 and insert the following: (cont'd)

18. The storage system of claim 17, wherein the storage array controller is further configured to calculate the preexisting checksum on the fly when initiating the extent scrubbing operation.

19. The storage system of claim 17, wherein the multi-unit data range is a multi-byte data range.

20. The storage system of claim 17, wherein the multi-unit data range is a multi-block data range.

21. A method of performing scrubbing operations in a storage array, comprising:

writing data to a first data range on one or more storage devices comprised in the storage array;

initiating a scrubbing operation for the first data range;

in response to said initiating:

reading the data from the first data range on the one or more storage devices comprised in the storage array;

calculating an extent checksum for the data read from the first data range;

comparing the extent checksum to a preexisting extent checksum for the first data range; and if the extent checksum differs from the preexisting extent checksum:

calculating a new unit checksum for a second data range, wherein the second data range is a subset of the first data range, comparing the new unit checksum to an existing unit checksum for the second data range; and

UNITED STATES PATENT AND TRADEMARK OFFICE
CERTIFICATE OF CORRECTION

| | | |
|---|---|---|
| PATENT NO. | : 7,062,704 B2 | Page 5 of 6 |
| APPLICATION NO. | : 09/880616 | |
| DATED | : June 13, 2006 | |
| INVENTOR(S) | : Nisha D. Talagala, Randall D. Rettberg and Chia Y. | |

It is certified that error appears in the above-identified patent and that said Letters Patent is hereby corrected as shown below:

Column 18, line 39 through column 22, line 54 and delete claims 1-54 and insert the following: (cont'd)

if the new unit checksum differs from the existing unit checksum, determining that the error is located within the second data range.

22. The method of claim 21, wherein a storage array controller performs said calculating and said comparing in response to said initiating.

23. The method of claim 22, wherein a storage device controller configured to control one or more storage devices on which a portion of the data in the first data range is stored performs said calculating and said comparing in response to said initiating.

24. The method of claim 21, wherein said writing data to the first data range further comprises calculating the preexisting extent checksum directly from the data written to the first data range.

25. The method of claim 24, wherein the preexisting extent checksum is calculated using a different algorithm than was used to calculate the one or more checksums for the first data range.

26. The method of claim 21, wherein said writing comprises calculating one or more existing unit checksums for the first data range.

27. The method of claim 26, wherein said initiating further comprises calculating the preexisting checksum from the one or more unit checksums for the first data range.

28. The method of claim 26, wherein the one or more existing unit checksums for the first data range each correspond to a block of data within the first data range.

29. The method of claim 26, wherein a storage array controller performs said calculating one or more existing unit checksums.

30. The method of claim 26, wherein a host computer system performs said calculating one or more existing unit checksums.

UNITED STATES PATENT AND TRADEMARK OFFICE
CERTIFICATE OF CORRECTION

PATENT NO. : 7,062,704 B2
APPLICATION NO. : 09/880616
DATED : June 13, 2006
INVENTOR(S) : Nisha D. Talagala, Randall D. Rettberg and Chia Y.

It is certified that error appears in the above-identified patent and that said Letters Patent is hereby corrected as shown below:

Column 18, line 39 through column 22, line 54 and delete claims 1-54 and insert the following: (cont'd)

31. The method of claim 21, further comprising initiating a reconstruction attempt of data within the second data range in response to said determining.-- in place thereof.

Signed and Sealed this

Tenth Day of July, 2007

JON W. DUDAS
*Director of the United States Patent and Trademark Office*